United States Patent [19]
Abe et al.

[11] Patent Number: 5,512,974
[45] Date of Patent: Apr. 30, 1996

[54] TARGET FOLLOW-UP DEVICE AND CAMERA COMPRISING THE SAME

[75] Inventors: Hiroyuki Abe; Masaru Muramatsu, both of Kawasaki; Tetsuro Goto, Funabashi; Tsutomu Narisawa, Kitaadachigun, all of Japan

[73] Assignee: Nikon Corporation, Tokyo, Japan

[21] Appl. No.: 291,603

[22] Filed: Aug. 16, 1994

Related U.S. Application Data

[62] Division of Ser. No. 114,148, Sep. 1, 1993, Pat. No. 5,392,088.

[30] Foreign Application Priority Data

Sep. 4, 1992 [JP] Japan .................................. 4-237390
Sep. 22, 1992 [JP] Japan .................................. 4-252737
Jun. 24, 1993 [JP] Japan .................................. 5-153332

[51] Int. Cl.$^6$ ........................... G03B 17/00; H04N 5/232
[52] U.S. Cl. ............................................ 354/430; 348/169
[58] Field of Search ................................... 354/402, 430; 348/169, 170, 171, 172, 352

[56] References Cited

U.S. PATENT DOCUMENTS

| | | | |
|---|---|---|---|
| 5,031,049 | 7/1991 | Toyama et al. | 354/402 X |
| 5,204,749 | 4/1993 | Toyama et al. | 354/402 X |
| 5,416,513 | 5/1995 | Morisaki | 348/169 |

FOREIGN PATENT DOCUMENTS

| | | |
|---|---|---|
| 439334 | 7/1991 | European Pat. Off. . |
| 56-86594 | 7/1981 | Japan . |
| 57-134763 | 8/1982 | Japan . |
| 4126473 | 4/1992 | Japan . |
| 2216743 | 10/1989 | United Kingdom . |

OTHER PUBLICATIONS

Patent Abstract of Japanese reference No. 57–129590, Aug. 1992.
Patent Abstract of Japanese reference No. 57–138278, Aug. 1992.
Patent Abstract of Japanese reference No. 57–147073, Sep. 1982.
Patent Abstract of Japanese reference No. 57–141723, Sep. 1982.
Patent Abstract of Japanese reference No. 58–22975, Feb. 1983.
Patent Abstract of Japanese reference No. 1–277829, Nov. 1989.
Patent Abstract of Japanese reference No. 4–132374, May 1992.
Patent Abstract of Japanese reference No. 2–87876, Mar. 1990.
Patent Abstract of Japanese reference No. 3–251806, Nov. 1991.

*Primary Examiner*—W. B. Perkey
*Attorney, Agent, or Firm*—Oliff & Berridge

[57] ABSTRACT

The target follow-up device of the present invention is adapted quickly and reliably to follow up the position of a target which is moving at high speed. It incorporates an imaging sensor having a number of imaging elements, which performs photometry over the photographic field and which outputs input image data. Based upon this imaging sensor output, input image data for the target to be followed up are stored as reference image data by a memory device. Based upon minimum residue calculation between the input image data and the reference image data, the target follow-up device of the present invention determines the position of the target. In this determination operation, the target follow-up device selects at least one color from a plurality of colors contained in common by the input image data and the reference image data, and calculates the minimum residue for the selected color component.

5 Claims, 29 Drawing Sheets

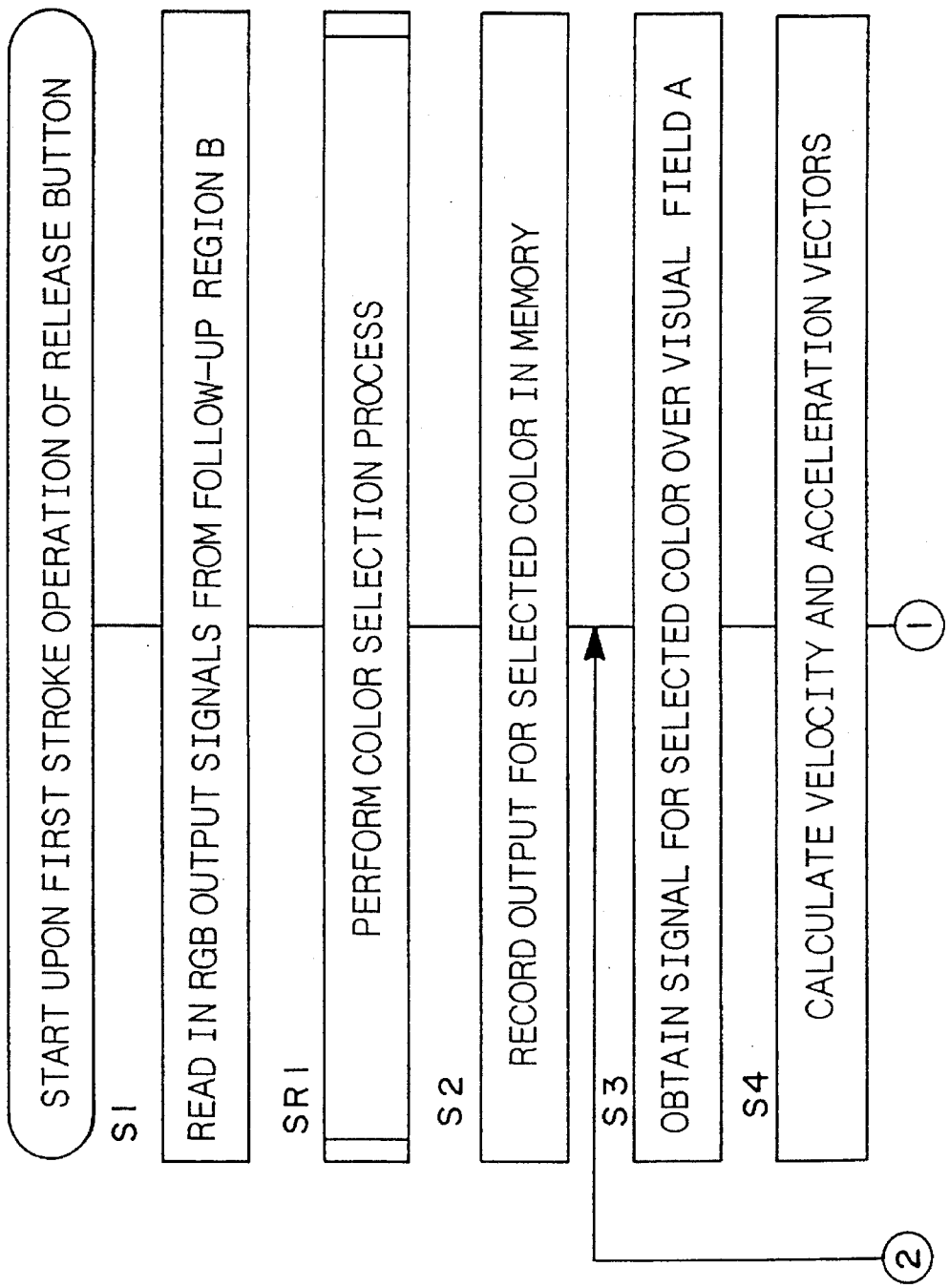

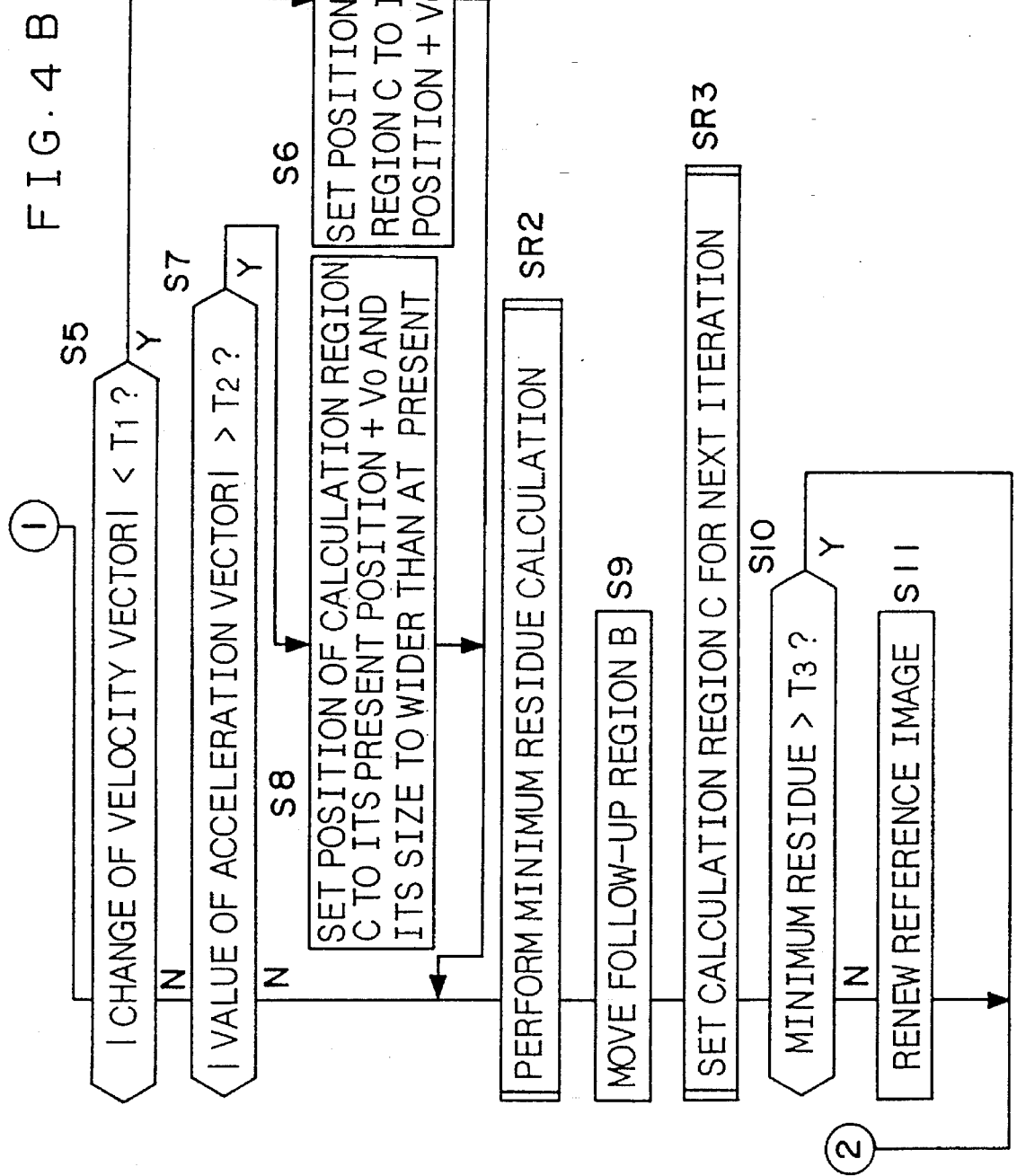

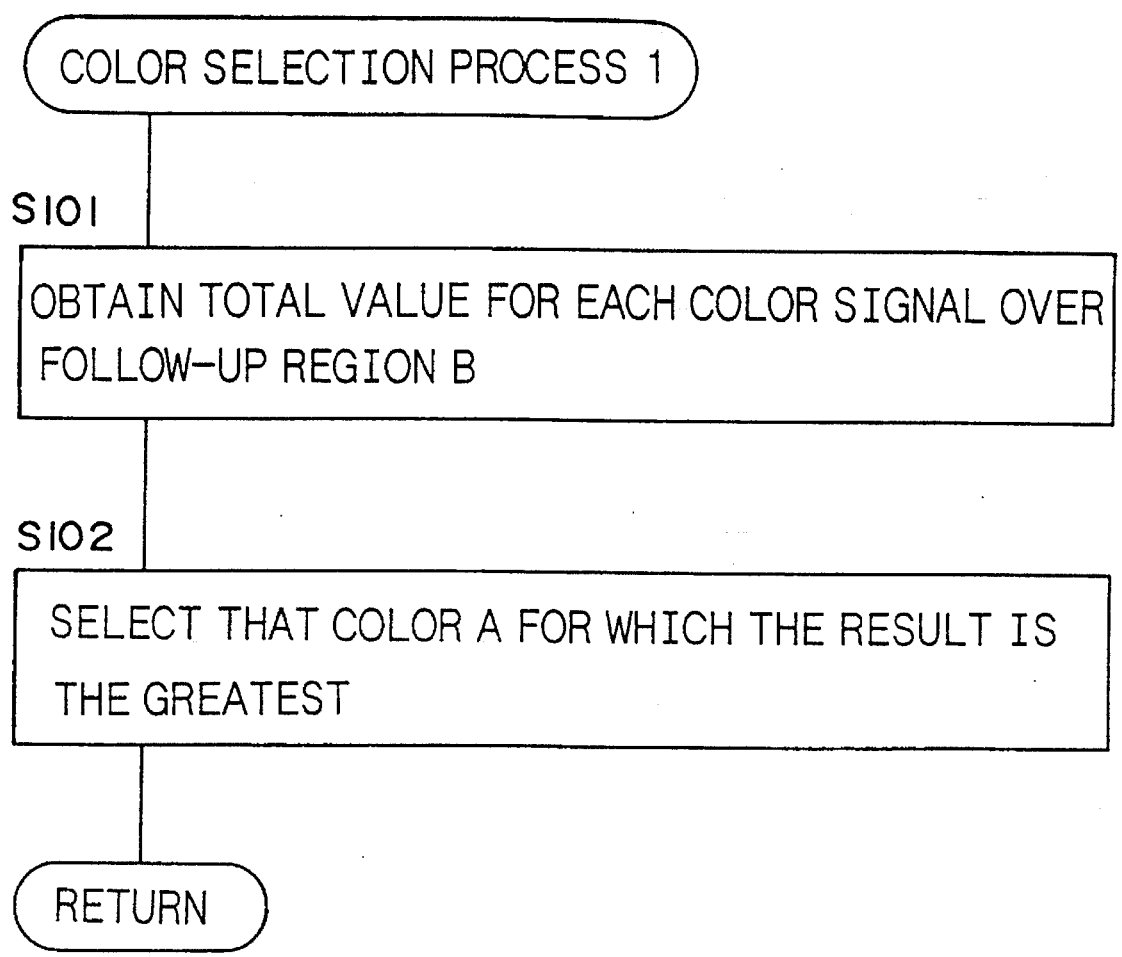

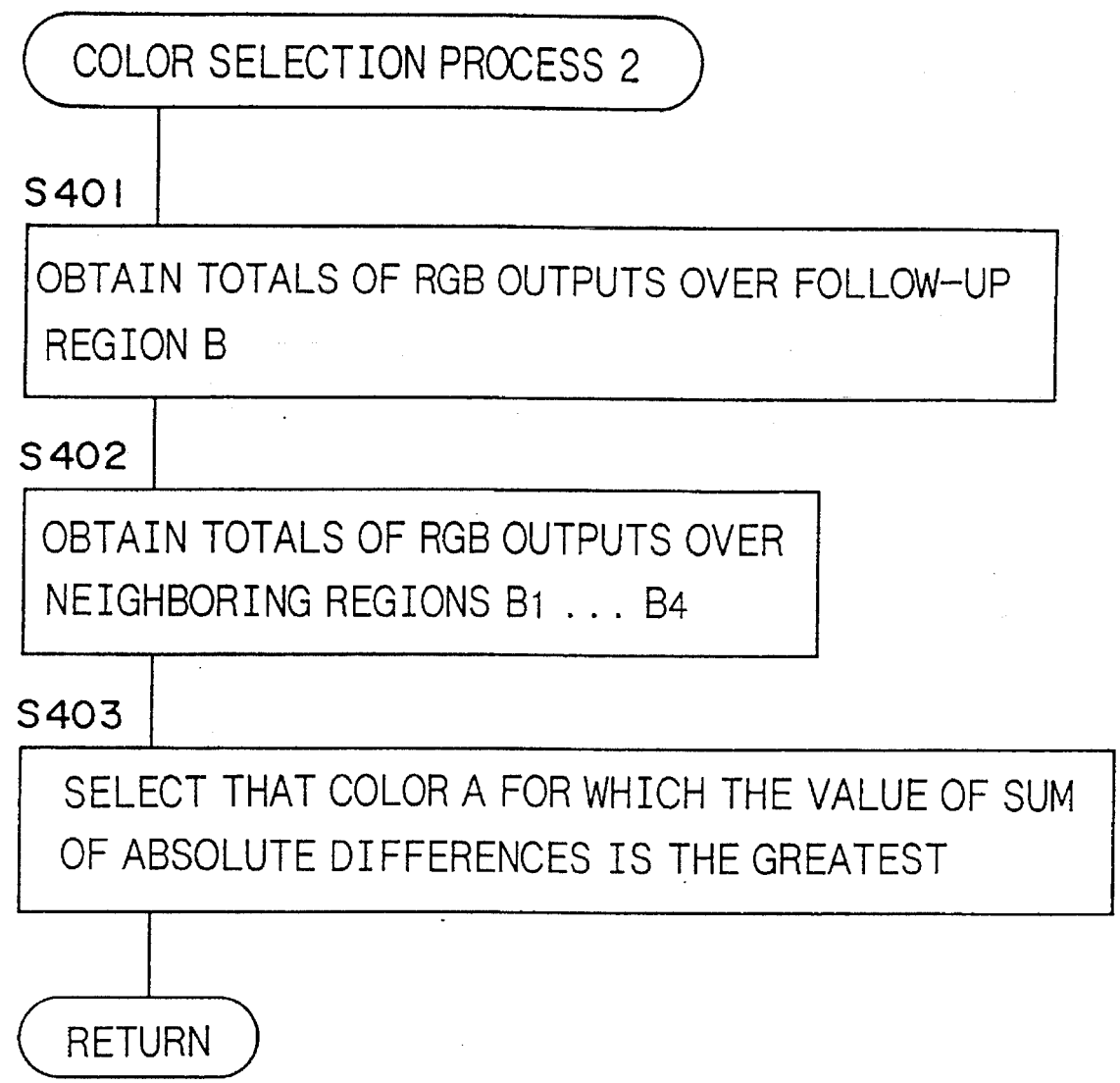

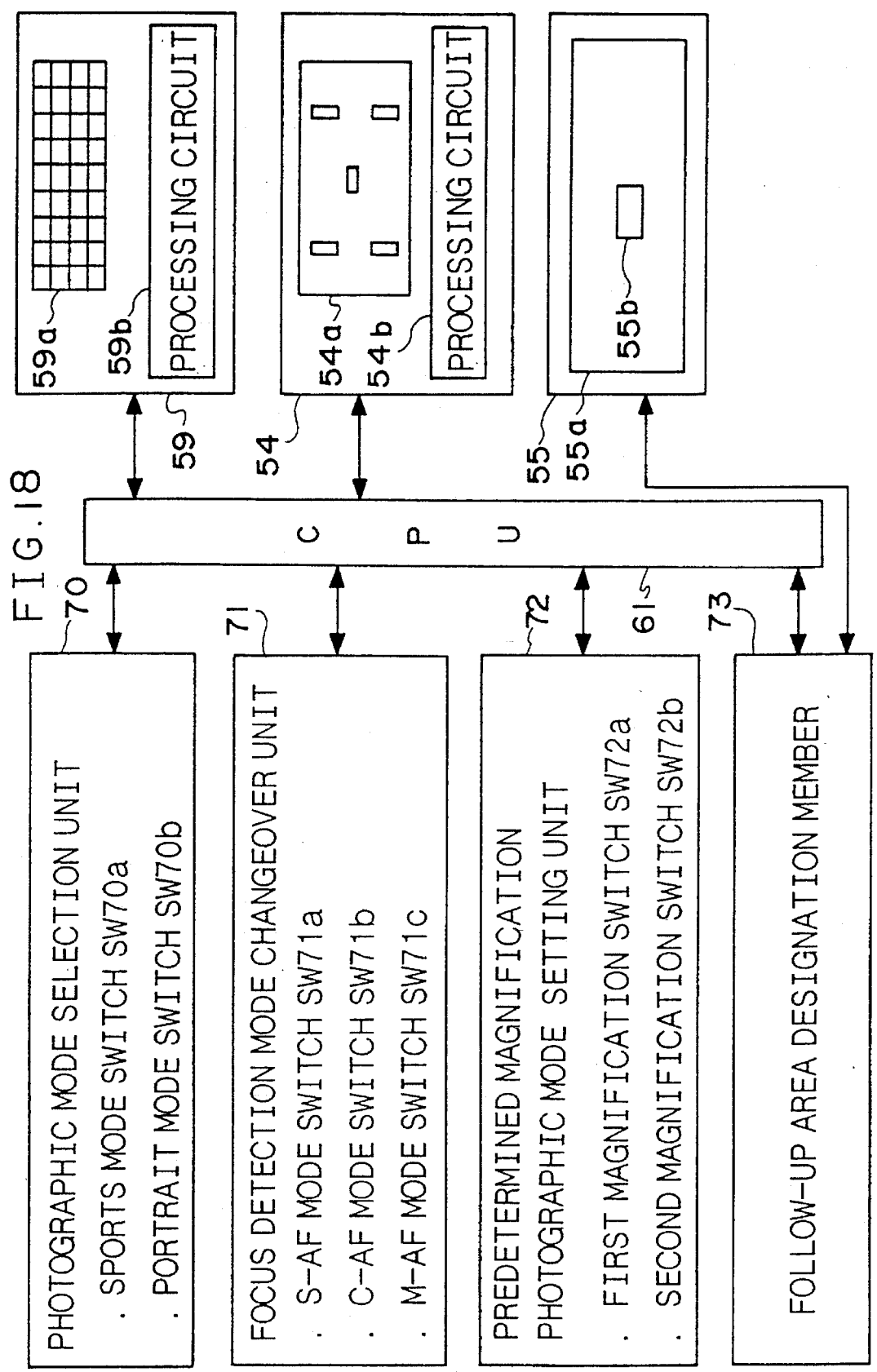

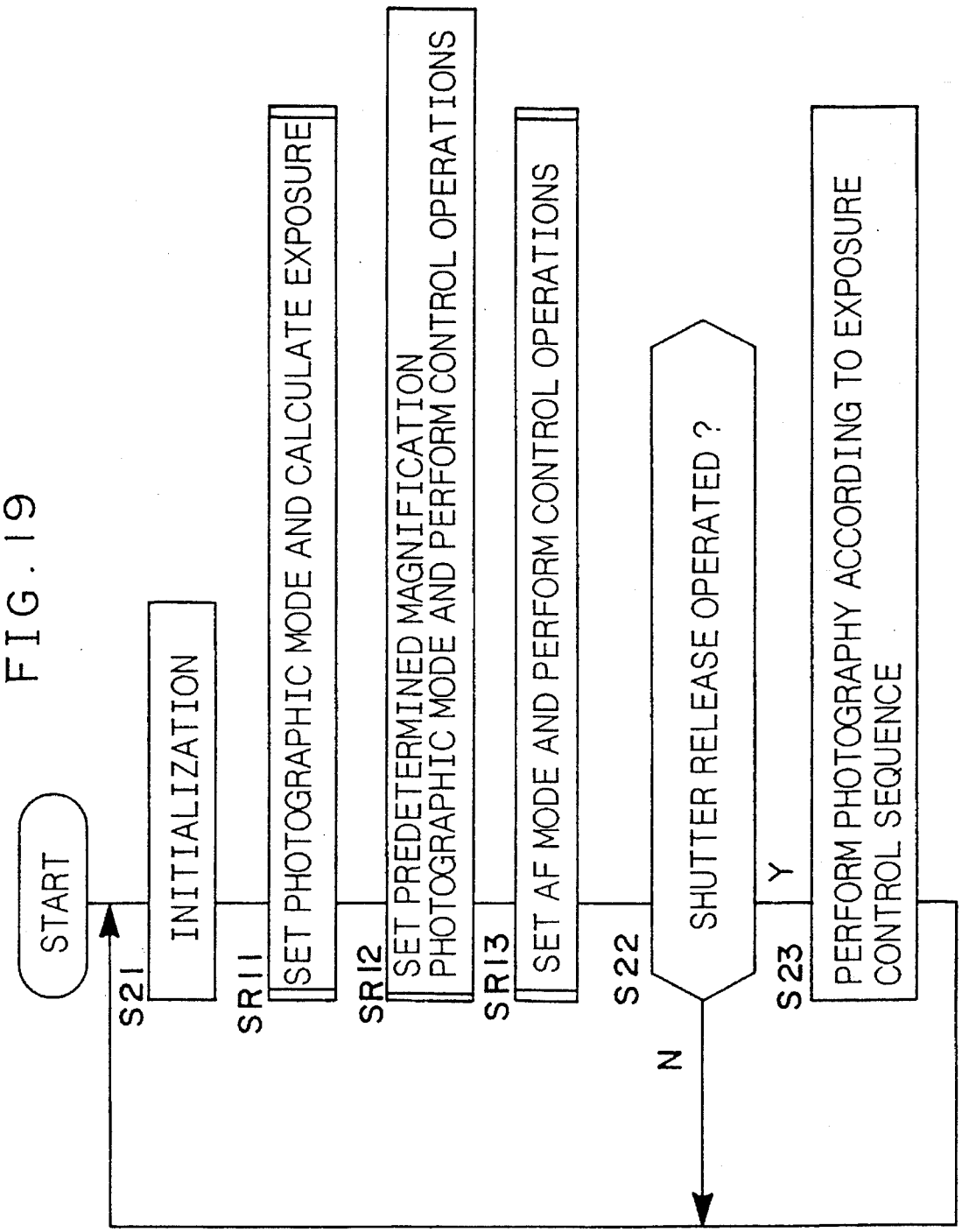

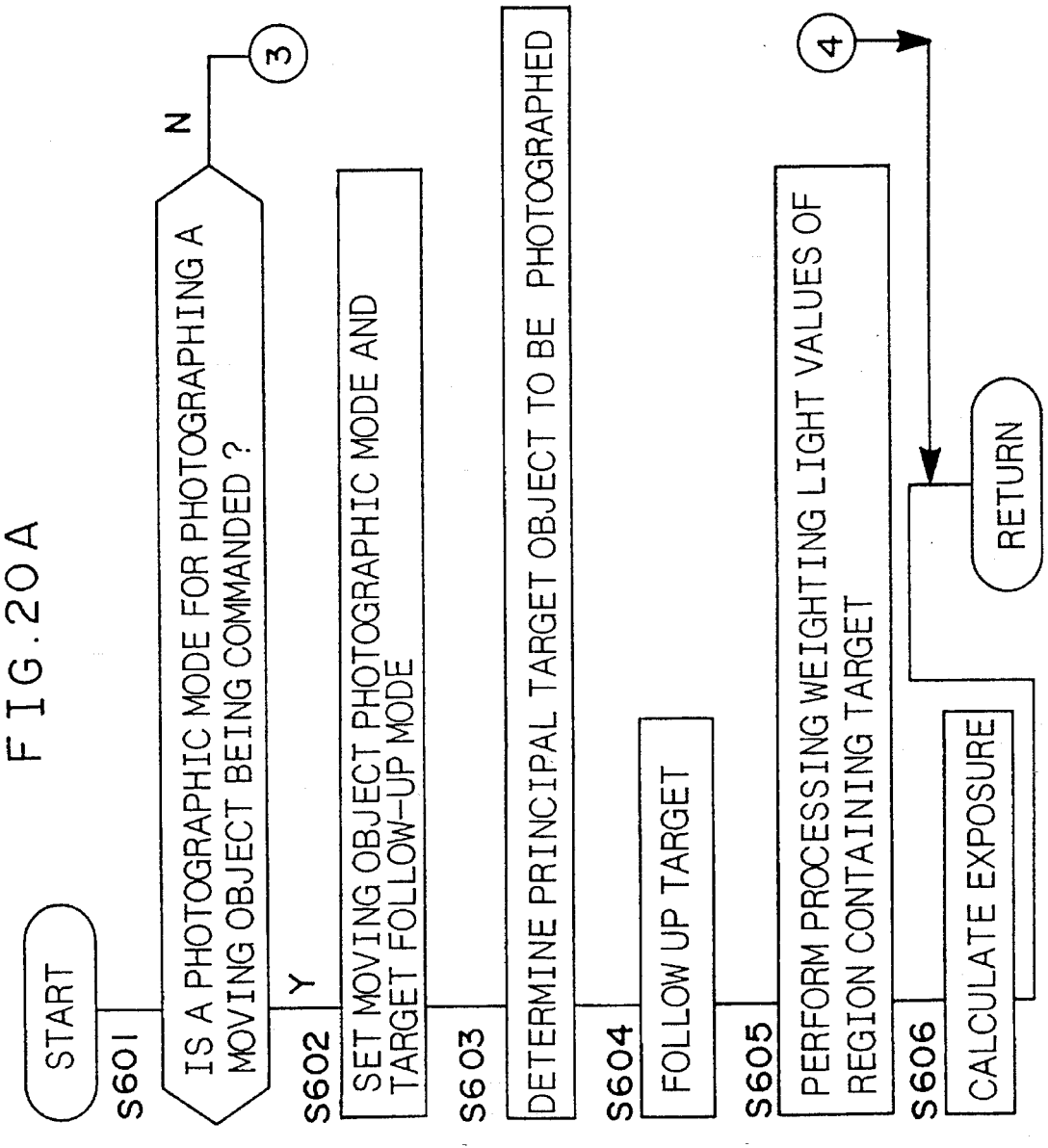

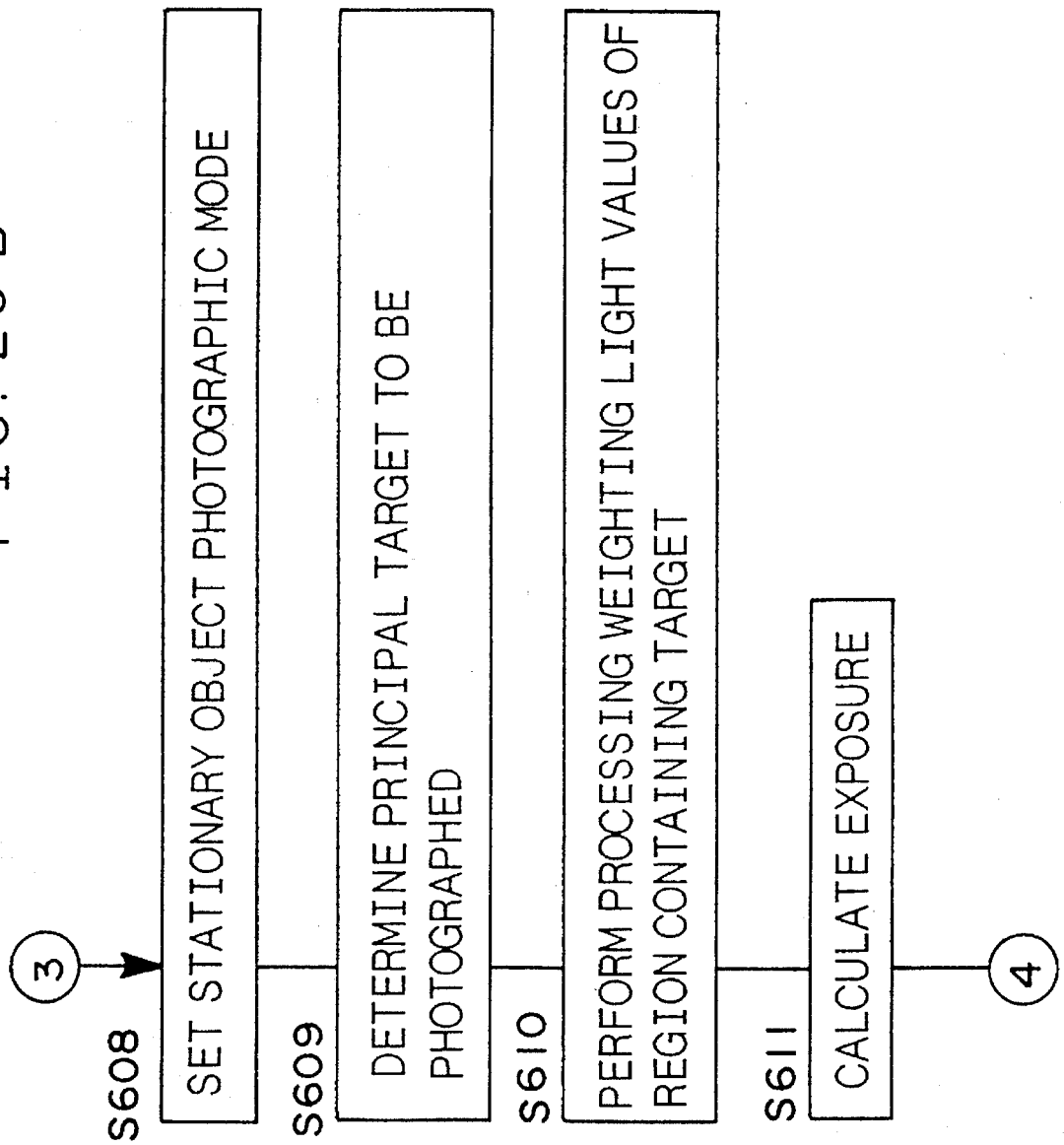

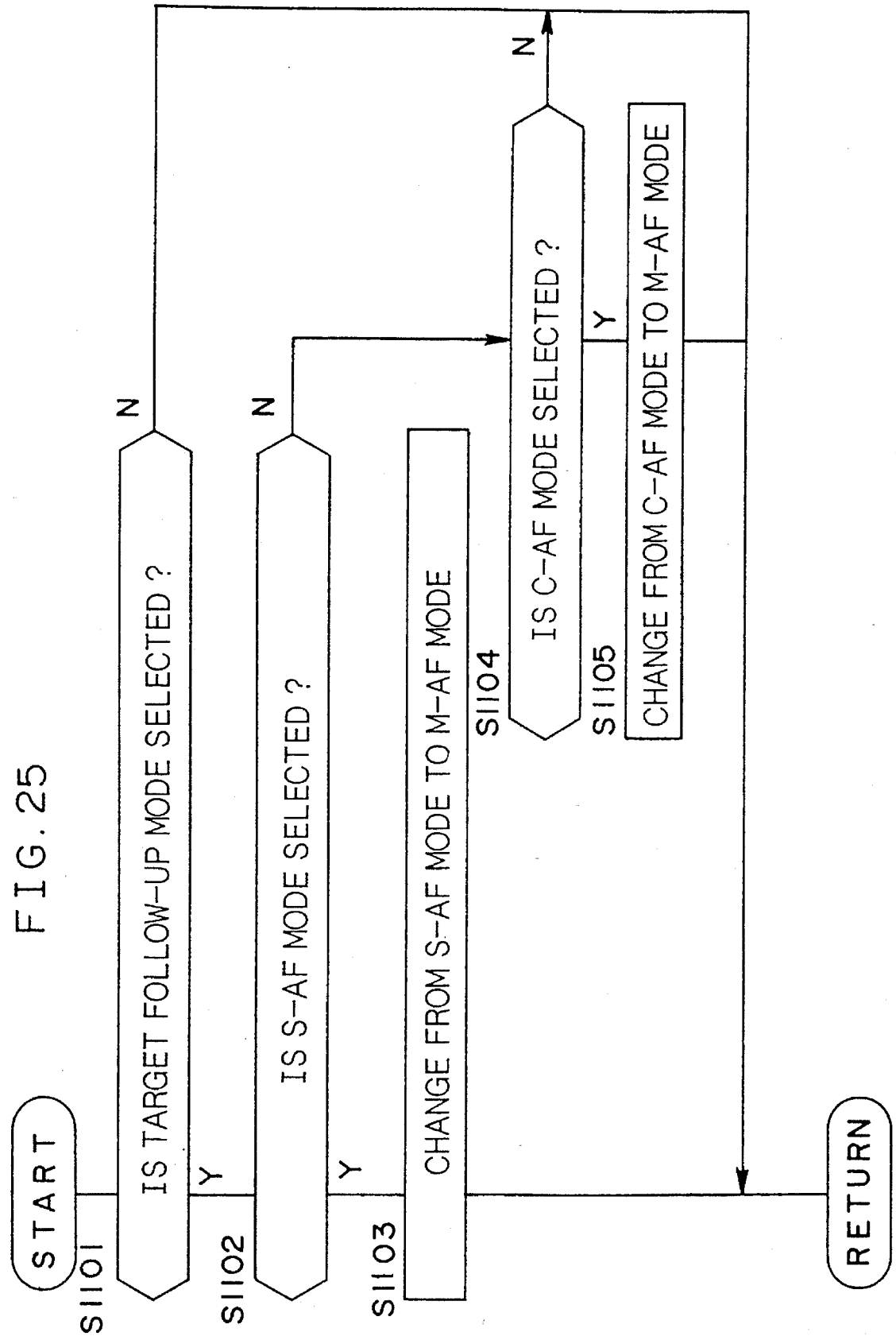

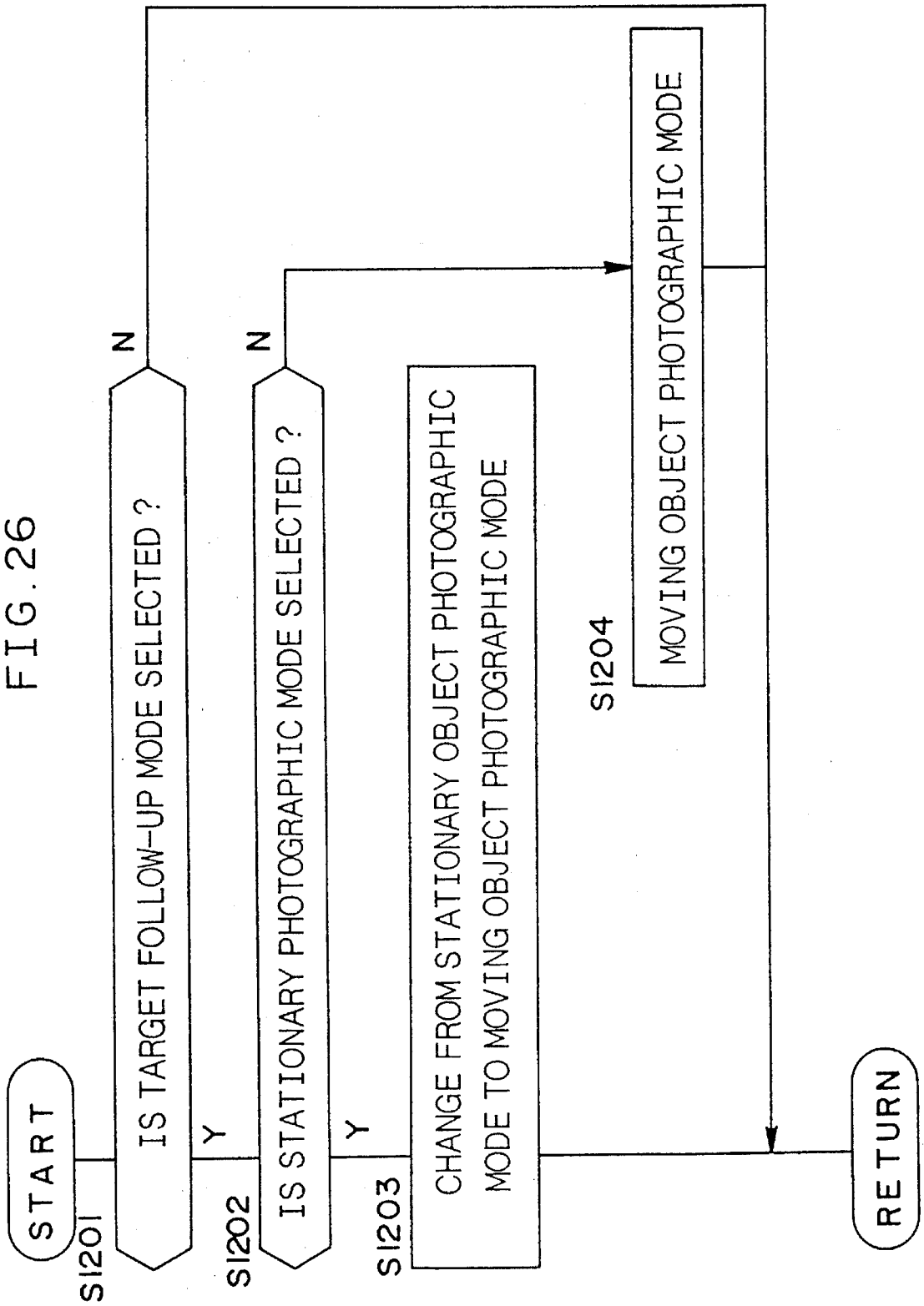

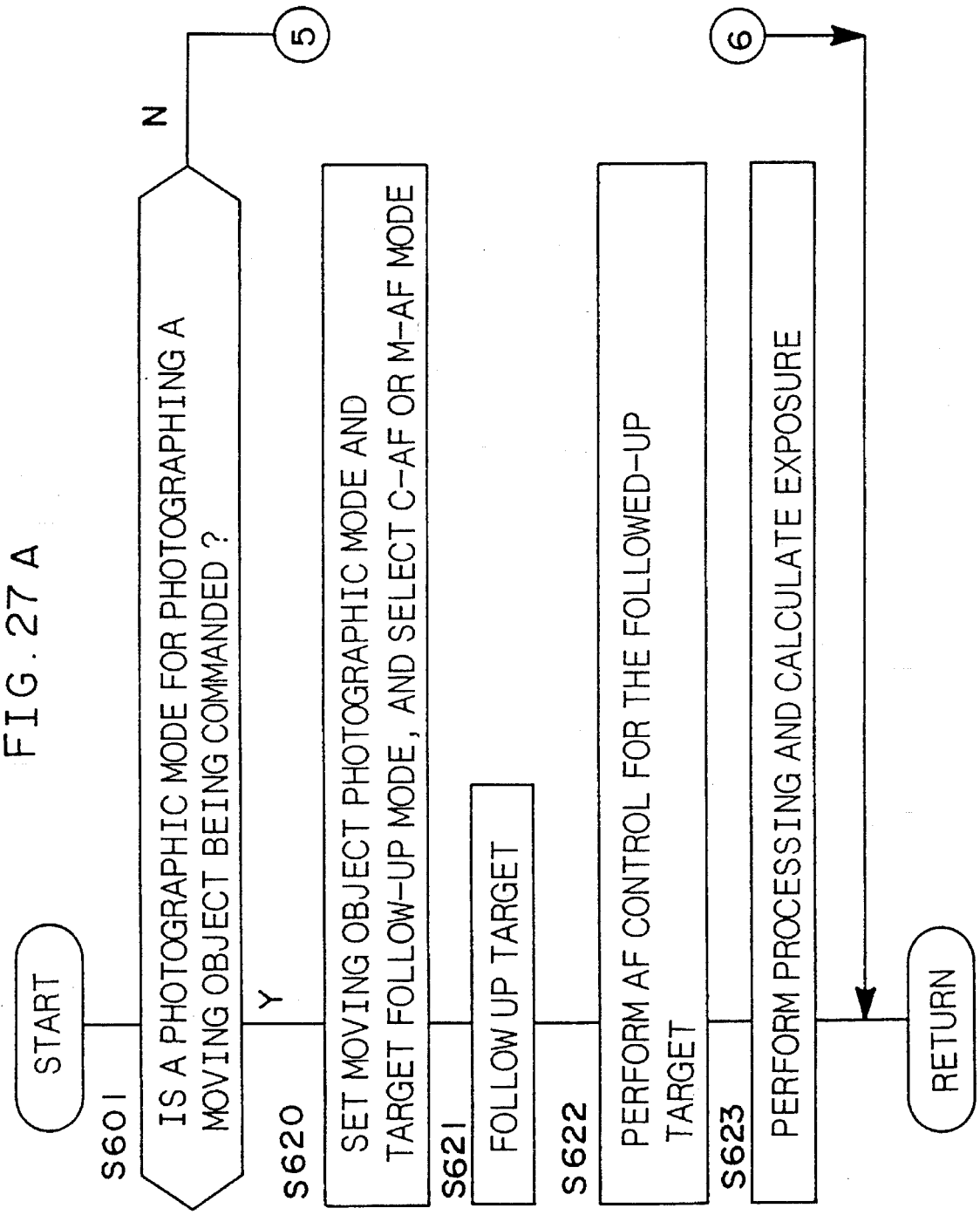

TARGET FOLLOW-UP DEVICE AND CAMERA COMPRISING THE SAME

This is a Division of application Ser. No. 08/114,148 filed Sep. 1, 1993, now U.S. Pat. No. 5,392,088.

BACKGROUND OF THE INVENTION

1. Field of the Invention

The present invention relates to a target follow-up device which follows up a predetermined target in the photographic field of an imaging device such as a camera or the like, and also relates to a camera equipped with such a target follow-up device.

2. Description of the Related Art

Such a type of target follow-up device has for example been described in Japanese Patent Publications 60-33350 and 61-19076. In these prior art devices, the correlation coefficient between a previously stored reference image and an input image obtained by A/D conversion of a picture signal supplied by an imaging device is calculated, and the predetermined target is followed up by determining which coordinates yield the maximum value of this correlation coefficient. In this case, with the intention of being able to perform follow up action in real time, a region for calculation of the correlation coefficient is established in the photographic field, and the calculation of the correlation coefficient with the reference image is performed over this region.

Further, there is a per se known type of device (for example, refer to U.S. Pat. No. 5,031,049) which follows up a target (the object to be photographed) within the photographic field by detecting a color difference signal over the photographic field, recording this color difference signal over a designated area (the area which the photographer designates as containing the principal target), comparing this recorded color difference signal with the color difference signal in the periphery of the designated area, and thereby determining to what position within the photographic field the principal target has moved.

Nevertheless, with these prior art type target follow-up devices, since the region for correlation calculation either was set by taking as its center the position of the target as determined in the previous iteration of the target follow-up process, or simply was a fixed area within the photographic field of view, therefore there has been a risk that, when photographing a sports scene or the like containing a target which is moving very quickly, the target may move out of the region for correlation calculation, which causes problems with regard to following up the position of the target. Further, when the shape of the target changes quickly, as again can easily occur when photographing a sports scene or the like (for example, when the target rotates quickly from a full frontal aspect to a profile aspect), or when the brightness of the target changes quickly (for example when it moves from a sunlit area to a shaded area), then in some cases it becomes impossible to perform accurate target follow-up by calculation of the correlation coefficient with reference image data recorded in advance.

Further, up to the present no camera has existed in which the operation of the above type of target follow-up device has been organically correlated with photographic modes, focus detection modes, or auto zoom modes of the camera.

Now, the expression "photographic mode" is used in this specification in the following manner, for example: the most suitable mode of exposure control for performing sports photography is termed the "sports photography mode", the most suitable mode of exposure control for performing portrait photography is termed the "portrait photography mode", etc. Further, the expression "focus detection mode" is used in this specification in the following manner, for example: a mode in which focusing adjustment movement of the photographic lens is repeatedly performed based upon the output of a focus detection device is termed the "continuous mode"; a mode in which, when once based upon the output of a focus detection device the condition in which of the photographic lens is on focus is detected, afterwards the driving of the photographic lens is forcibly stopped is termed the "one shot mode", a mode in which the focus can be independently detected for a plurality of regions in the photographic field of view based upon the output of a focus detection device is termed the "multi mode", etc. Further, with an automatic zoom lens, there are so called "auto zoom" modes like one in which the zoom lens is automatically driven so as always to maintain a photographic magnification determined in advance, even in the event of change in the photographic distance or the like, etc.

SUMMARY OF THE INVENTION

An object of the present invention is to provide a target follow-up device which can quickly, accurately, and reliably follow up the position of a target which is moving at high speed.

Another object of the present invention is to provide a camera equipped with a target follow-up device, in which the operability of the camera is enhanced by the provision of organic liaison between the operation of the target follow-up device and existing camera modes such as the photographic mode, the focus detection mode, the auto zoom mode, etc.

In order to attain these objects there is proposed, according to the present invention as expressed in one manner, a target follow-up device, having: an imaging means which outputs input image data having a plurality of color components; a memory means which, based upon the output from said imaging means, records image data of a target to be followed up as reference data; a calculation means which calculates the amount of correlation such as a minimum residue between said input image data and said reference image data; and a position detection means which, based upon said minimum residue, detects the position of said target; comprising a color selection means which selects at least one color from a plurality of colors contained in common by said input image data and said reference image data; wherein said calculation means calculates said minimum residue for the color component selected by said color selection means.

Further, according to the present invention as expressed in another manner, there is proposed a target follow-up device, comprising: an imaging means which outputs input image data; a memory means which samples a portion of said input image data which is to be used as image data of a target to be followed up, and records it as reference data; a calculation means which repeatedly calculates the minimum residue between said reference image data and said input image data in a calculation region wider than the region which includes said reference image data set within said photographic field; and a position detection means which, based upon said minimum residue, detects the position of said target; and a region setting means which sets said calculation region to be used for the next iteration, based upon said minimum residue which was calculated by said calculation means.

Further, according to the present invention as expressed in another manner, there is proposed a target follow-up device, having: an imaging means which outputs input image data; a memory means which, based upon the output from said imaging means, records as reference data image data of a target to be followed up; a calculation means which calculates the minimum residue between said reference image data and said input image data; and a position detection means which, based upon said minimum residue, detects the position of said target; comprising a refreshing means which, each time the detection of the position of said target is performed by said position detection means, samples at least a portion of said input image data according to the position of said target, and refreshes said reference image data for the next iteration using said input image data thus calculated; and wherein said calculation means calculates said minimum residue using the reference image data refreshed by said refreshing means.

Further, according to the present invention as expressed in another manner, there is proposed a target follow-up device, having: an imaging means which outputs input image data; a memory means which, based upon the output from said imaging means, records as reference data image data of a target to be followed up; a calculation means which calculates the minimum residue between said reference image data and said input image data; and a position detection means which, based upon said minimum residue, detects the position of said target; comprising a movement detection means which detects the movement of said target based upon at least two of the positions of said target detected successively by said position detection means, and a position prediction calculation means which calculates a predicted position of said target from the movement of said target detected by said movement detection means.

Further, according to the present invention as expressed in another manner, there is proposed a camera having a target follow-up device which follows up the movement of an object to be photographed, comprising: a photographic mode setting means which possesses a plurality of photographic modes for performing suitable exposure control according to photographic circumstances, and which includes among said plurality of photographic modes a moving target photographic mode which is suitable for when said object to be photographed is moving; and a control means which starts said target follow-up device when said moving body photographic mode is set by said photographic mode setting means.

Further, according to the present invention as expressed in another manner, there is proposed a camera having a target follow-up device which follows up the movement of an object to be photographed, comprising: a follow-up starting means which starts said target follow-up device; a photographic lens; a drive means which drives said photographic lens; a focusing detection means which detects the focus adjustment condition of said object to be photographed; a focus detection mode changeover means which is operated to change over between a continuous mode in which focus adjustment movement of said photographic lens is repeatedly performed by said drive means based upon the output of said focusing detection means, and a one shot mode in which, when once the focus adjustment condition of said photographic lens has been detected, based upon the output of said focusing detection means, subsequently the movement of said photographic lens by said drive means is compulsorily stopped; and a control means which changes over from said one shot mode to said continuous mode when said target follow-up device is started by said follow-up starting means, even if said one shot mode is selected by said focus detection mode changeover means.

Further, according to the present invention as expressed in another manner, there is proposed a camera having a target follow-up device which follows up the movement of an object to be photographed, comprising: a follow-up starting means which starts said target follow-up device; a photographic lens; a drive means which drives said photographic lens; a focusing detection means which detects the focus adjustment condition of said object to be photographed for a plurality of focus detection regions; a focus detection mode changeover means which is operated to change over between a continuous mode in which focus adjustment movement of said photographic lens is repeatedly performed by said drive means for one or another of said plurality of focus detection regions based upon the output of said focusing detection means, and a multi mode in which focus detection is possible independently for said plurality of focus detection regions, based upon the output of said focusing detection means; and a control means which changes over from said continuous mode to said multi mode when said target follow-up device is started by said follow-up starting means, even if said continuous mode is selected by said focus detection mode changeover means.

Further, according to the present invention as expressed in another manner, there is proposed a camera having a target follow-up device which follows up the movement of an object to be photographed, comprising: a follow-up starting means which starts said target follow-up device; a photographic lens; a drive means which drives said photographic lens; a focusing detection means which detects the focus adjustment condition of said object to be photographed for a plurality of focus detection regions; a focus detection mode changeover means which is operated to change over between a one shot mode in which, when once the focus adjustment condition of said photographic lens has been detected, based upon the output of said focusing detection means for one or another of said plurality of focus detection regions, subsequently the movement of said photographic lens by said drive means is compulsorily stopped, a continuous mode in which focus adjustment movement of said photographic lens is repeatedly performed by said drive means for one or another of said plurality of focus detection regions based upon the output of said focusing detection means, and a multi mode in which focus detection is possible independently for said plurality of focus detection regions, based upon the output of said focusing detection means; and a control means which, when said target follow-up device is started by said follow-up starting means, changes over from said one shot mode or said continuous mode to said multi mode, even if said one shot mode or said continuous mode is selected by said focus detection mode changeover means.

Further, according to the present invention as expressed in another manner, there is proposed a camera having a zoom lens, comprising: a light receiving means which comprises a plurality of light receiving elements disposed in the form of a matrix; an extraction means which extracts a characteristic signal of an object to be photographed based upon the output of said light receiving means; an operating means which is operated in order to input a fixed magnification; a calculating means which calculates the proportion which said characteristic signal of said object to be photographed, extracted by said extraction means, occupies of the photographic field; and a zoom control means which drive controls said zoom lens so as to bring said proportion calculated by said calculating means substantially to correspond to said fixed magnification.

Further, according to the present invention as expressed in another manner, there is proposed a camera having a zoom lens, comprising: a light receiving means which comprises a plurality of light receiving elements disposed in the form of a matrix; an extraction means which extracts a characteristic signal of an object to be photographed based upon the output of said light receiving means; a memory means which records said characteristic signal of said object to be photographed, extracted by said extraction means; a calculating means which calculates the proportion said object to be photographed occupies of the photographic field, based upon said characteristic signal of said object to be photographed recorded by said memory means; and a zoom control means which drive controls said zoom lens so as to maintain said proportion calculated by said calculating means at a substantially constant proportion.

Further, according to the present invention as expressed in another manner, there is proposed a camera having a zoom lens, comprising: a light receiving means which comprises a plurality of light receiving elements disposed in the form of a matrix; an extraction means which extracts a characteristic signal of an object to be photographed based upon the output of said light receiving means; a memory means which records said characteristic signal of said object to be photographed, extracted by said extraction means; an operating means which is operated in order to record in said memory means a characteristic signal for an object to be photographed which is present within a predetermined region of the photographic field; a calculating means which, when said operating means is operated, calculates the proportion which said object to be photographed occupies of the photographic field, based upon said characteristic signal recorded by said memory means; and a zoom control means which drive controls said zoom lens so as to maintain said proportion calculated by said calculating means at a substantially constant proportion.

Further, according to the present invention as expressed in another manner, there is proposed a camera having a target follow-up device which follows up the movement of an object to be photographed, comprising: a follow-up starting means which starts said target follow-up device; a photographic mode setting means which possesses a plurality of photographic modes for performing suitable exposure control according to photographic circumstances, and which includes among said plurality of photographic modes a moving target photographic mode which is suitable for when said object to be photographed is moving; and a control means which controls said photographic mode setting means so as to set said moving target photographic mode, when said target follow-up device is started by said follow-up starting means.

According to the present invention, because the time period required for the calculation is reduced, it is possible to perform follow-up action to detect the position even of a quickly moving target rapidly and accurately. Further, since the calculation region is set appropriately, or a predicted position of the target is calculated, therefore even if the position of the target varies widely it can be followed up accurately and reliably. Yet further, it is possible adequately to cope with alteration of the shape or the brightness of the target.

Moreover, according to the present invention, since the target follow-up device is started in accordance with the photographic mode, thereby it becomes possible always to perform the most suitable type of control according to the photographic situation of the object to be photographed. Further, when a fixed magnification is selected, it is possible always to maintain this fixed magnification based upon the proportion of the photographic field occupied by the principal object to be photographed. Yet further, since the focus detection mode is set to the most suitable mode when the target follow-up device is started, focus adjustment is performed properly and accurately.

BRIEF DESCRIPTION OF THE DRAWINGS

FIG. 4A and FIG. 4B are flow charts for a main program which is executed by a calculation device incorporated in the FIG. 1 camera, in order to realize the operation of the first embodiment of the present invention;

FIG. 5 is a flow chart for a first version of a subroutine SR1 for color selection, which is called from the FIG. 4A main program;

FIG. 6 is a flow chart for a second version of this color selection subroutine SR1;

FIG. 18 is a block diagram of the camera shown in FIG. 17;

FIG. 19 is a flow chart which describes the flow of a main routine of a program executed by a CPU 61 incorporated in the FIG. 17 camera;

FIG. 20A and FIG. 20B are flow charts for explaining a first version of a subroutine S11 of the program executed by the CPU 61 for setting photographic mode;

FIG. 25 is a flow chart for explaining a third version of this AF mode selecting subroutine SR13;

FIG. 26 is a flow chart for explaining a second version of the setting photographic mode; and:

FIG. 27A and FIG. 27B are flow charts for explaining a third version of the setting photographic mode.

DETAILED DESCRIPTION OF THE PREFERRED EMBODIMENTS

First Embodiment

Figure 1:
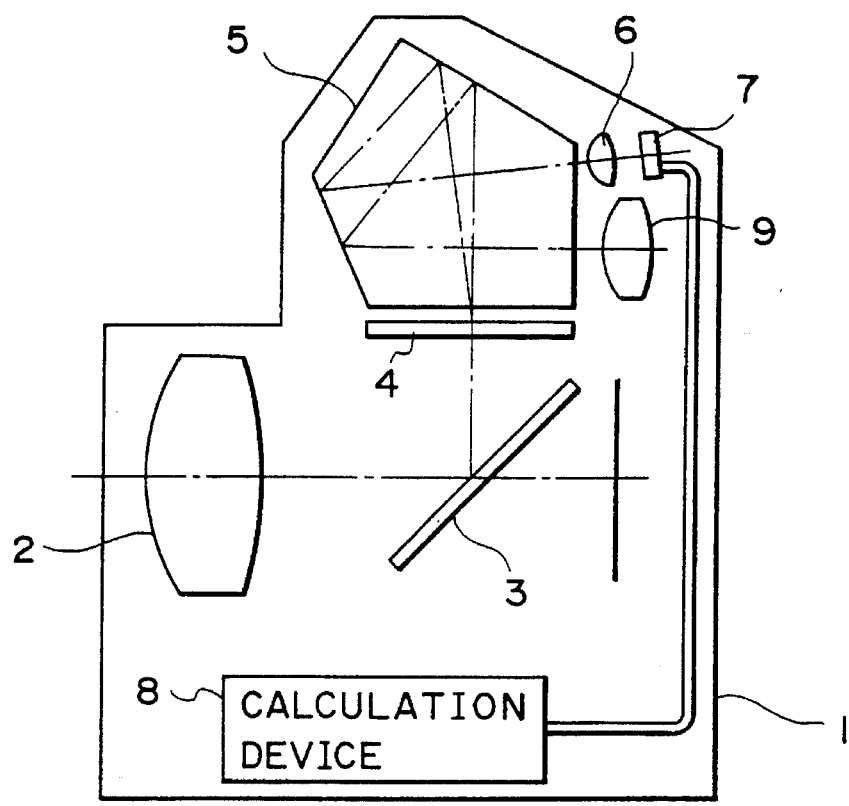
FIG. 1 is a schematic side view of a camera to which a target follow-up device according to the first embodiment of the present invention has been applied.

FIG. 1 is a schematic side view showing a camera incorporating a target follow-up device according to the first embodiment of the present invention. Referring to this figure, the reference numeral 1 denotes a single lens reflex camera (hereinafter simply termed a camera) suitable for silver halide photography. In this camera, light rays emanating from an object to be photographed (which is located generally to the left of the figure but is not particularly shown) pass through a lens 2 provided in a front portion of the camera 1, are reflected from a mirror 3 in an upwards direction in the figure, and are focused to form an image on a screen 4. The photographer inspects this image of the object to be photographed which is focused on the screen 4 through a prism 5 and an eyepiece lens 9. The image of the object to be photographed focused on the screen 4 is also focused again on an imaging sensor 7 by a lens 6, and the output from this imaging sensor 7 is processed by a calculation device 8 which may be implemented by a microcomputer or the like of a per se known type, not particularly shown. The calculation device 8 is provided with a memory unit not particularly shown in the figure, and in this memory unit a reference image to be used as a template is stored as digital data.

Figure 2:
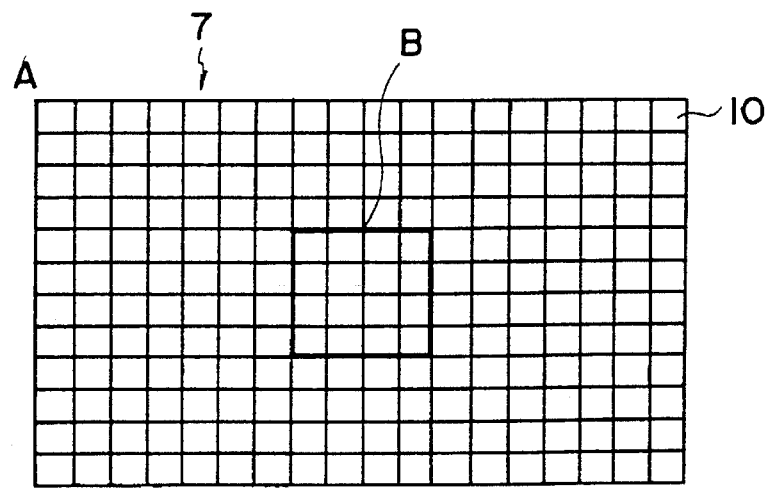
FIG. 2 is a figure showing details of an imaging sensor included in the FIG. 1 camera.

FIG. 2 is a figure showing details of the imaging sensor 7. As shown in FIG. 2, the imaging sensor 7 comprises a number of imaging elements 10 arranged in a rectangular matrix, shown exemplarily in the figure as being 18 horizontally by 12 vertically, and an image equivalent to the photographic image field which is being inspected by the photographer is focused on this imaging sensor 7 by the lens 6. In FIG. 2, A denotes a visual region (namely, typically, the entire imaging sensor 7) corresponding to the entire photographic field which is being inspected by the photographer, while B denotes a follow-up region which shows the detected position of the target. In the shown first embodiment of the present invention, this follow-up region B is a 4×4 rectangle of imaging elements. The manner in which this follow-up region B is set will be described hereinafter. The photographer can check the initial position for the follow-up region B within the visual region A, and the position during target follow-up if the photographer desires by ocular inspection, for example by a liquid crystal means or the like of transparent type provided on the screen 4.

Figure 3:
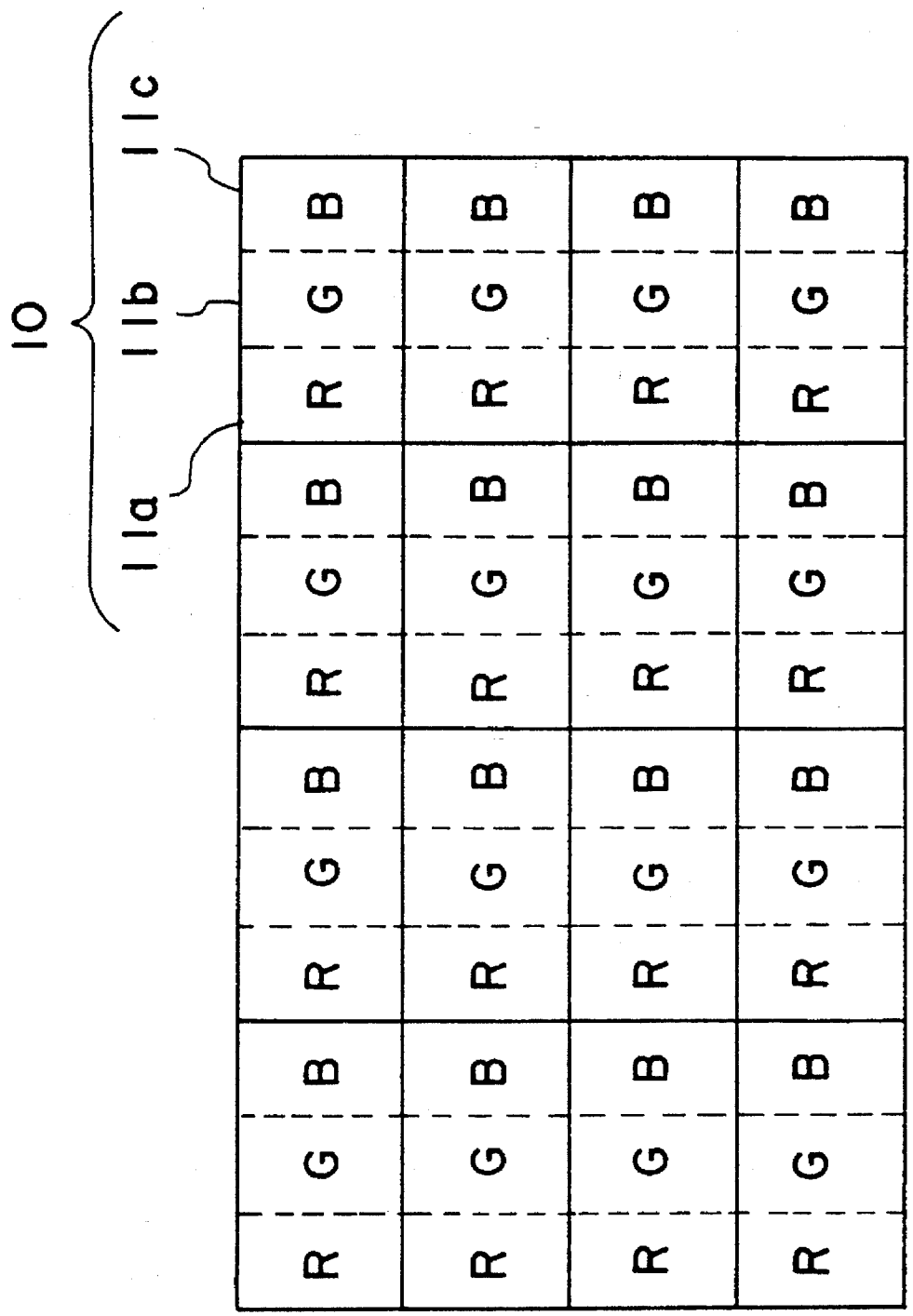
FIG. 3 is a figure showing the detailed arrangement of elements and sub-elements on the imaging sensor of FIG. 2.

Each of the imaging elements 10 is divided into three imaging sub-elements 11a through 11c, as shown in FIG. 3 which is a figure showing the detailed arrangement of the imaging elements 10 and their imaging sub-elements 11 on the imaging sensor 7. Further, as shown in the figure, each of the imaging sub-elements 11a is fitted with a red filter, each of the imaging sub-elements 11b is fitted with a green filter, and each of the imaging sub-elements 11c is fitted with a blue filter. Accordingly an RGB color output signal corresponding to the image of the object to be photographed is obtained from the imaging elements 10, each being considered as a unit. In the following descriptions, each of these colors red, green, or blue respectively will be indicated by the capital letter R, G, or B prefixed to its corresponding imaging element, signal, etc.

Next, the operation of the camera 1 according to the first embodiment of the present invention will be explained with reference to the flow charts shown in FIGS. 4, 5, 8, and 9, and with reference to the explanatory diagrams of FIGS. 10 through 15.

(1) The color selection process

The calculation device 8 starts to obey the program shown in the flow charts of FIG. 4A and FIG. 4B, at the stage in which the object to be photographed (which will be set as the target according to the photographer observing its image) is captured within the follow-up region B, by the photographer giving an order for target acquisition of the object to be photographed, for example by the operation of first stroke operation of a release button (not shown in the figure) or the like. Moreover, when this program is started, the follow-up region B is set to be positioned exactly in the center of the visual region A, as shown in FIG. 2.

First, in the step S1, the RGB output signal from each imaging element 10 of the imaging sensor 7 within the follow-up region B is read in. The RGB output signals thus obtained from within the follow-up region B are stored within a temporary memory element (not particularly shown) incorporated in the calculation device 8. Next, in the subroutine SR1, a color selection process is performed, in which one or the other of the color output signals (the R signal, the G signal, or the B signal) is selected from the RGB output signal thus obtained from within the follow-up region B.

The details of a first variant of this subroutine SR1 for the color selection process, which is employed in this first embodiment, are shown in the flow chart of FIG. 5. First, in the step S101, for each of the colors R, G, and B, the corresponding portions of the RGB output signals obtained in the step S1 are summed over all the imaging elements 10 within the follow-up region B, so as to produce three total values for the three colors. Next, in the step S102, the maximum value of these three total values obtained in the step S101 as a result of the triple summation procedure is obtained, and that one of the colors R, G, and B is designated as the selected color α, the summation for which produced that maximum value. This FIG. 5 subroutine then terminates and returns control to the main program whose flow chart is shown in FIG. 4A.

Next, in the step S2 of this main program, the output signals from the RGB output signals from the follow-up region B which correspond to the color α which was selected in the subroutine SR1 are set as $B_{ij}$ (i, j=1 ... 4), and are stored in a matrix form in a memory device (not particularly shown) incorporated in the calculation device 8. These values $B_{ij}$ are reference image data in which is included an image (the target) of the desired object to be photographed, the position of which should be followed up.

(2) Setting the calculation region

In the next step S3, the output signal for the color α is obtained from the imaging sensor 7 for each imaging element 10 in the visual region A. This color α output over the visual region A is stored in the temporary memory means, not particularly shown, of the calculation device 8.

Figure 10:
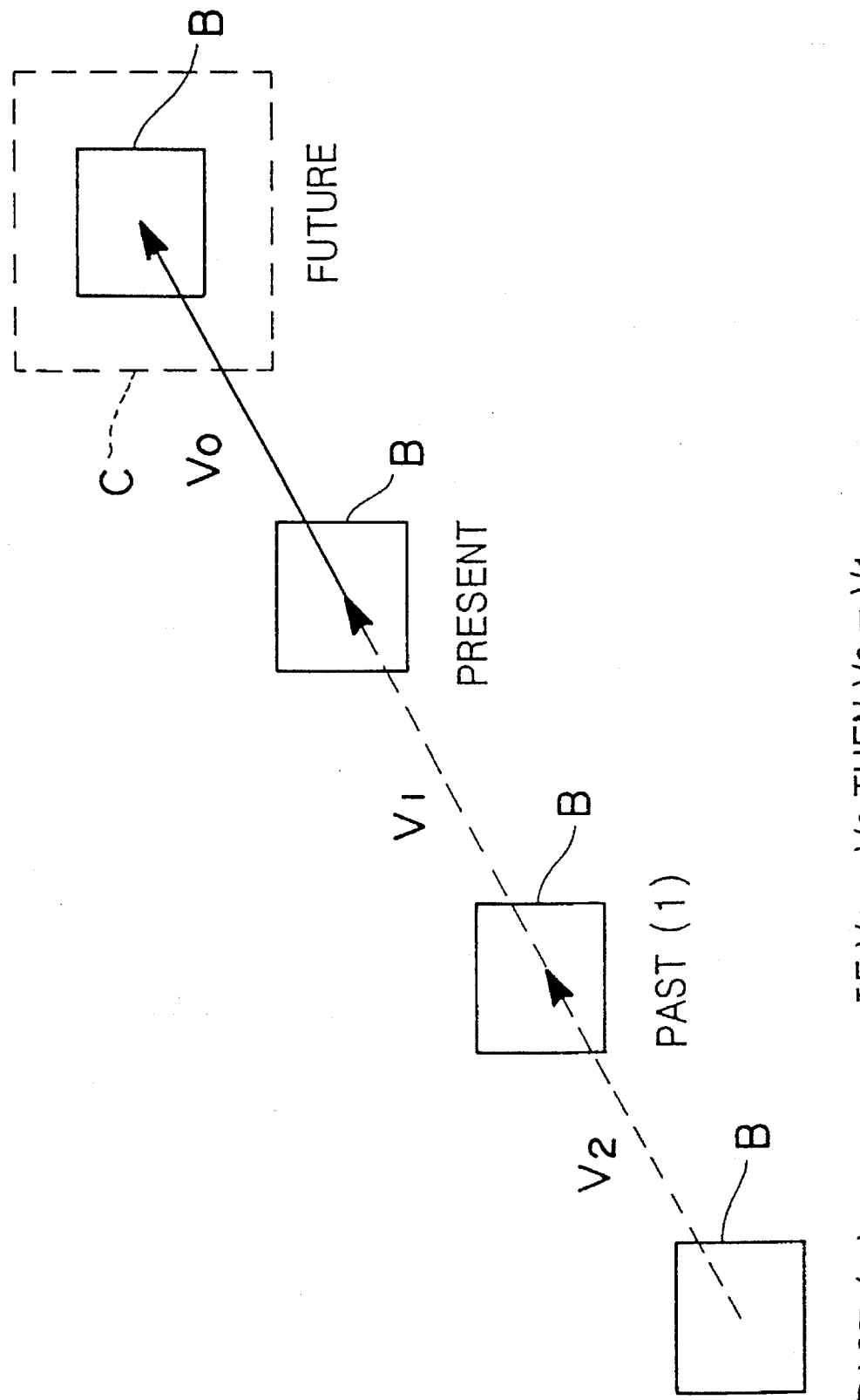
FIG. 10 is a figure showing the definition of a velocity vector, and the prediction from this velocity vector of the position of an object to be photographed.

In the next step S4, the velocity (taken as a vector quantity) and the acceleration (taken as a vector quantity also) of the follow-up region B are calculated. As shown in FIG. 10, the follow-up region B is moved in the visual region A along with the movement of the object to be photographed, and in the step S9 to be described hereinafter its position is set each time the position of the object to be photographed is detected. The velocity vector V $(v_x,v_y)$ is defined as the number of imaging elements over which the follow-up region B has moved in the horizontal direction (also in the following called the X direction) and in the vertical direction (also in the following called the Y direction), during the time interval in which the detection process in the step S9 for the target object to be photographed is executed. Further, the acceleration vector AC $(a_x,a_y)$ is defined as the amount of change $(a_x=v_{1x}-v_{2x}, a_y=v_{1y}-v_{2y})$ in the X direction and in the Y direction between two neighboring velocity vectors $V_1$ and $V_2$ (refer to FIG. 10).

In the next decision step S5, a decision is made as to whether or not each individual one of the absolute values $|V_{1x}-V_{2x}|$, $|V_{1y}-V_{2y}|$ of the amount of change of each component of the velocity vector (i.e., of each component of the acceleration vector) calculated in the previous step S4 is less than a previously determined threshold value $T_1$; and if the result of this decision is YES then the flow of control proceeds to the step S6, while if the result of the decision is NO then the flow of control proceeds to the step S7. This threshold value $T_1$ is for determining whether or not the object to be photographed is moving at an almost constant velocity, and should be suitably set in view of inaccuracies etc. in measurement of the velocity vector.

In the step S6, because the amount of change between the velocity vectors $V_1$ and $V_2$ is a small value less than the threshold value $T_1$, it is judged that the object to be photographed will also move with almost the same velocity vector during the next time interval for the next iteration of this program loop, and accordingly, supposing $V_0=V_1$, as shown in FIG. 10, the calculation region C (which will be described later) is set to a position displaced just by the velocity vector $V_0$ from the present position of the follow-up region B (i.e. the position of the follow-up region B which was set according to follow-up action last time round this program cycle). After this, the flow of control proceeds next to the subroutine step SR2.

In the step S7, a decision is made as to whether or not the absolute value of the acceleration vector AC calculated in the step S4 is greater than a previously determined threshold value $T_2$, and if the result of this decision is YES then the flow of control proceeds to the step S8, while if the result of the decision is NO then the flow of control proceeds to the subroutine step SR2. This threshold value $T_2$ is for determining whether or not the object to be photographed is moving at a velocity which is changing abruptly, and should be suitably set in view of the size of the calculation region, etc.

In the step S8, since the value of the acceleration vector AC is a large value greater than the threshold value $T_2$, it is judged that the movement of the object to be photographed is irregular (its speed may perhaps get greater, or it may perhaps stop unexpectedly, etc. ), and accordingly, supposing $V_0=V_1$, a calculation region C larger than the normal calculation region (for example, twice as large in both the X direction and in the Y direction, or even more) is set at a position displaced just by the velocity vector $V_0$ from the present position of the follow-up region B.

In a case where both of the decisions at step S5 and S7 are negated, a calculation region C is set to a position same as a position of a calculation region which was set last time round this program cycle.

(3) Minimum residue calculation

Minimum residue calculation is performed in the next subroutine step SR2. The details of the subroutine SR2 for minimum residue calculation are shown in the flow chart of FIG. 8. First, in the step 201, initialization of various values used in the calculation is performed. In practice, this includes setting a detection region D to be positioned at the upper left corner of the calculation region C as shown in FIG. 11, and setting a counter n to 1.

Figure 11:
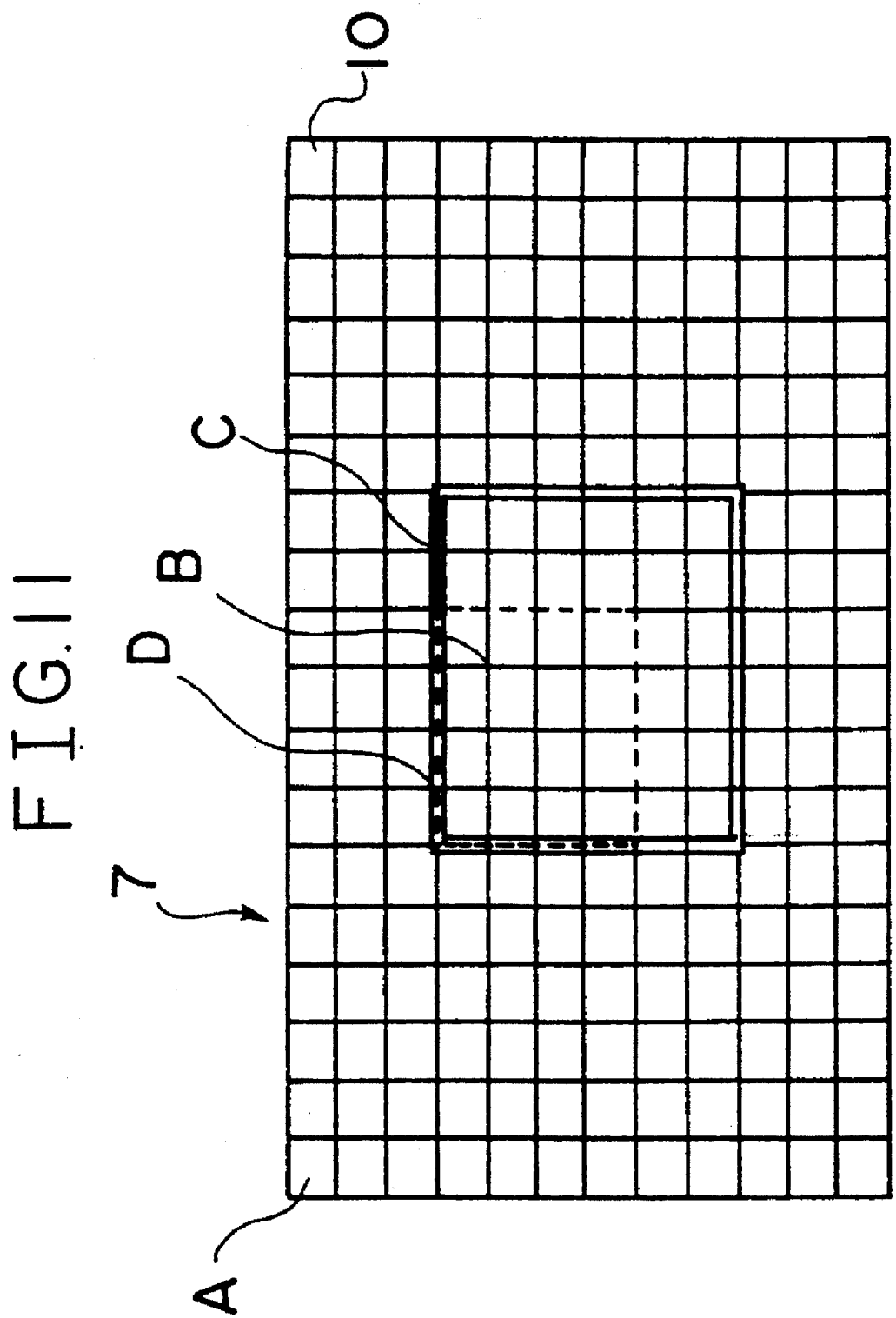
FIG. 11 is a figure showing the positional relationships of a follow-up region B, the calculation region C, and a detection region D when these regions are as initially set.

FIG. 11 is a figure showing the positional relationships of the follow-up region B, the calculation region C, and the detection region D when they are initially set. Referring to this figure, C denotes the calculation region, which is the region in which the object to be photographed is searched for. In the figure it is shown by way of example that the calculation region C is set to a region which is centered on the follow-up region B and which is wider than the follow-up region B by just one imaging element both leftwards and rightwards in the X direction and upwards and downwards in the Y direction; but as will be described hereinafter the size of the calculation region C is not to be considered as being limited to the example shown in this figure. D denotes the detection region, which is the region in which residue calculation with respect to the follow-up region B is performed, and in the shown example, just like the follow-up region B, this detection region D is a 4×4 rectangle of imaging elements. Next, in the step S202, the output for the color α from each imaging element in the calculation region C is obtained.

Figure 12:
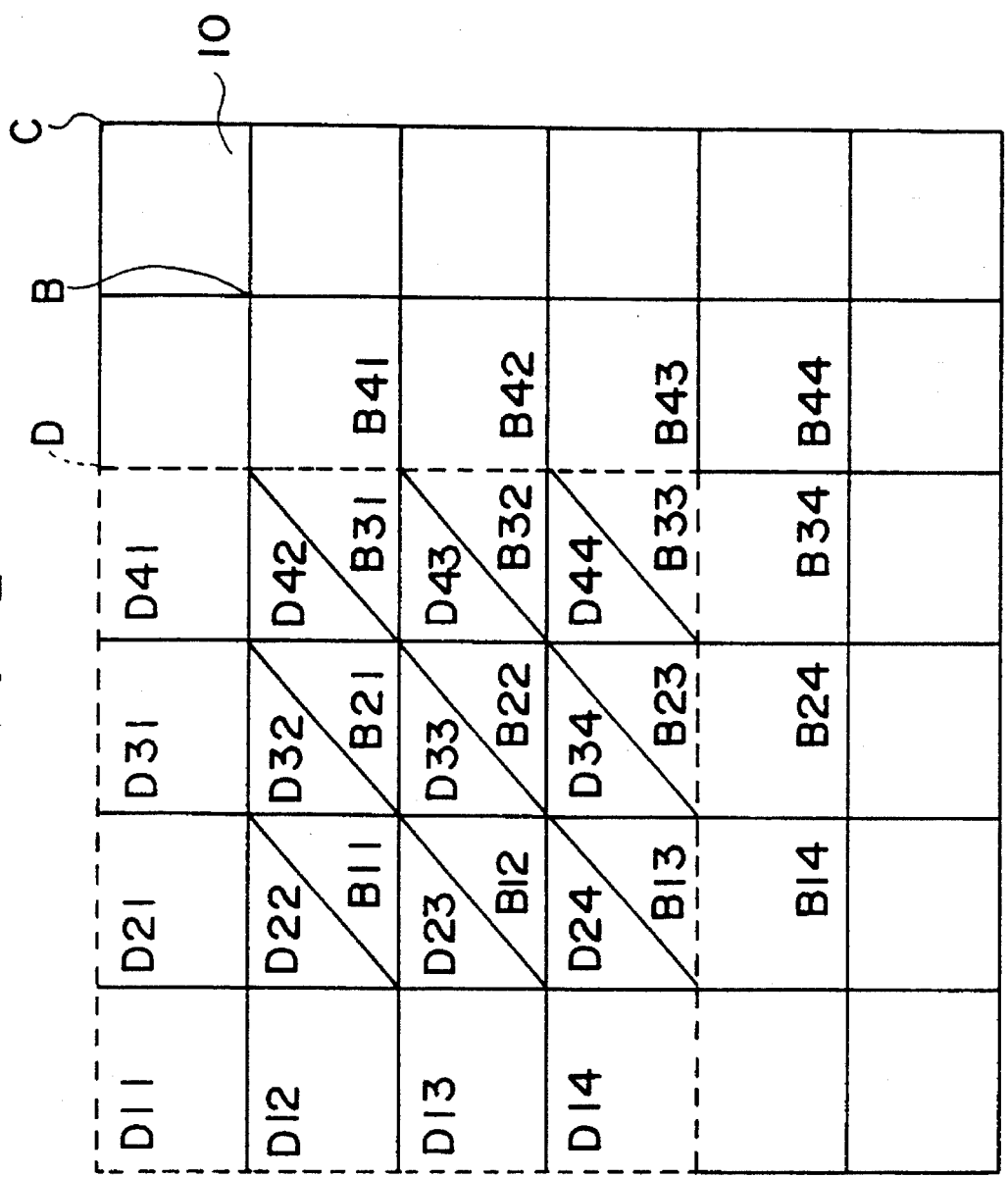
FIG. 12 is a figure showing the relationship between the indices for the color outputs from the follow-up region B and from the detection region D, when these regions are as initially set before residue calculation.

Next, in the step S203, the output $D_{ij}$ (i,j =1 . . . 4) for the color α from each element of the detection region D set in the step S201 is obtained from the outputs for the entire visual region A which were stored in step S3 of the main routine of FIG. 4A. The relationship between the indices for the outputs $B_{ij}$ for the color α for the follow-up region B (these are also reference image data) and the indices for the outputs $D_{ij}$ for the color α for the detection region D is shown in FIG. 12, for the case when these regions are initially set as shown in FIG. 11.

Next, in the step S204, the residue is calculated for the reference image data $B_{ij}$ and the outputs $D_{ij}$ for the detection region D. This residue is defined as being the sum over all possible combinations of the indices i and j of the absolute values of the differences between corresponding ones of these quantities, i.e. between ones of these quantities which have the same indices; in other words, in the shown case, this residue is equal to $\Sigma\Sigma W_{ij}|B_{ij}-D_{ij}|$, where the summation is over i=1 to 4 and j=1 to 4. The coefficients $W_{ij}$ are weighting coefficients, and this coefficients prevent the residue from becoming minimum at points where the object to be photographed does not exist (so called pseudo-watching). This phenomenon may because the amount of information reduce when calculating the absolute values of the differences, and in addition, the amount of information reduce furthermore when calculating the total sum. These weighting coefficients are set to be the greater the closer are the imaging elements to the center, in consideration of the fact that the closer an imaging element is to the center of the reference image data $B_{ij}$ the higher is the probability that it gives important data about the object to be photographed; and their values are obtained by experiment. One effective setting for these weighting coefficients $W_{ij}$ is for $W_{ij}$ to be equal to 2 if both i and j are either 2 or 3, and for $W_{ij}$ to be equal to 1 in all other cases. The residue is set as a variable $Sum_n$ where n is a suffix indicating the number of times calculation has been repeated within the calculation region C, and it is stored in the memory means, not particularly shown, of the calculation device 8.

Figure 13:
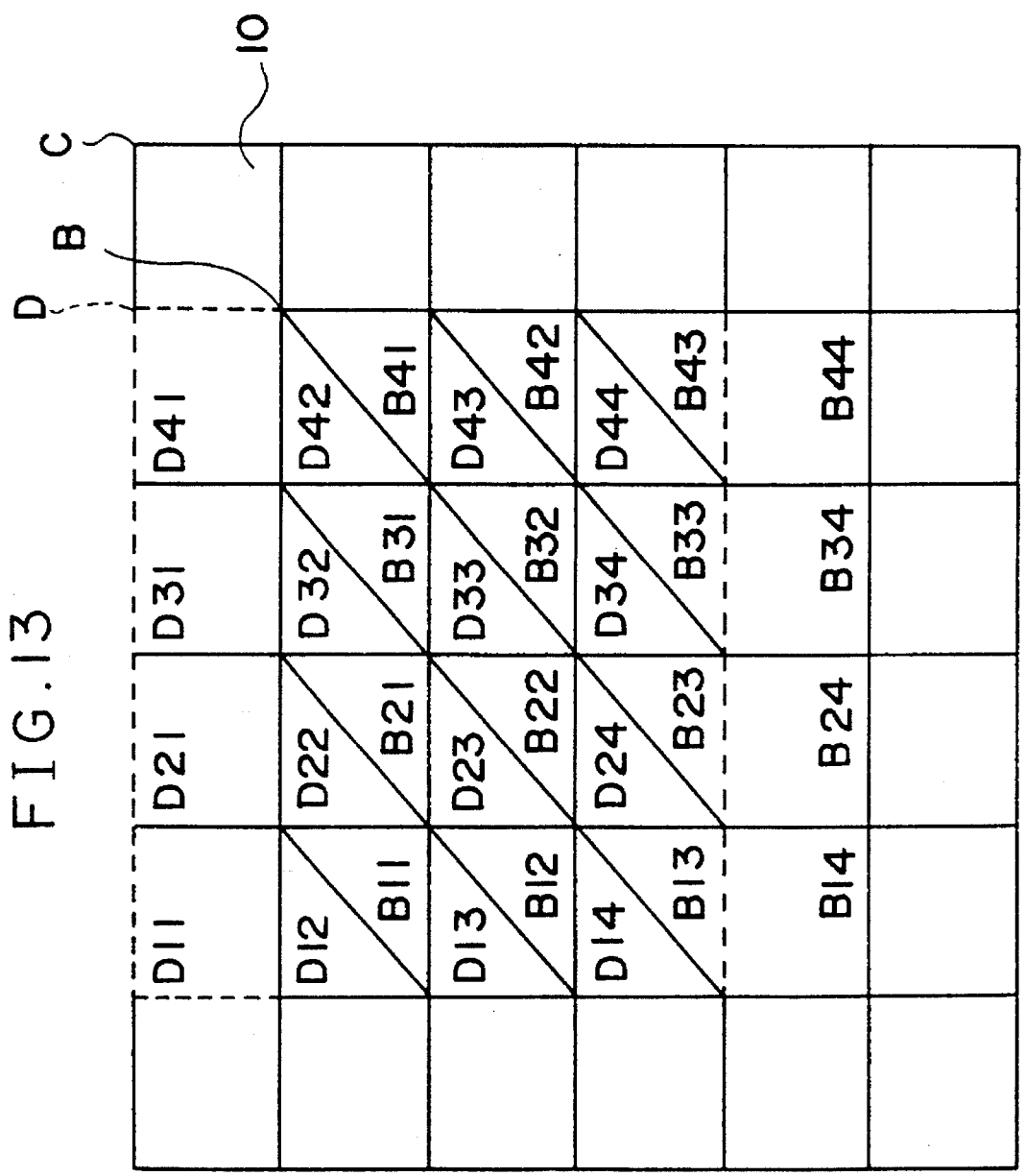
FIG. 13 is a figure showing the relationship between the indices for the color outputs from the follow-up region B and from the detection region D, during residue calculation.

Next, in the step S205, the detection region D is moved for the next residue calculation, and the value of the counter n is incremented by one. In detail, the detection region D is moved by one imaging element to the right if this can be done within the calculation region C; but, if the right edge of the detection region D is already in coincidence with the right edge of the calculation region C, then the detection region D is moved down by one imaging element and is also shifted all the way to the left within the calculation region C, so that the left edge of the detection region D comes into coincidence with the left edge of the calculation region C. By doing this, the detection region D is repeatedly moved from left to right as seen in FIGS. 11 and 12, each time also being moved downwards by one row of detection elements. FIG. 13 shows the relationship between the indices for the color α output $B_{ij}$ from the follow-up region B and for the color α output $D_{ij}$ from the detection region D, in the state where the detection region D has been shifted by one detection element to the right from its FIG. 12 position.

Figure 14:
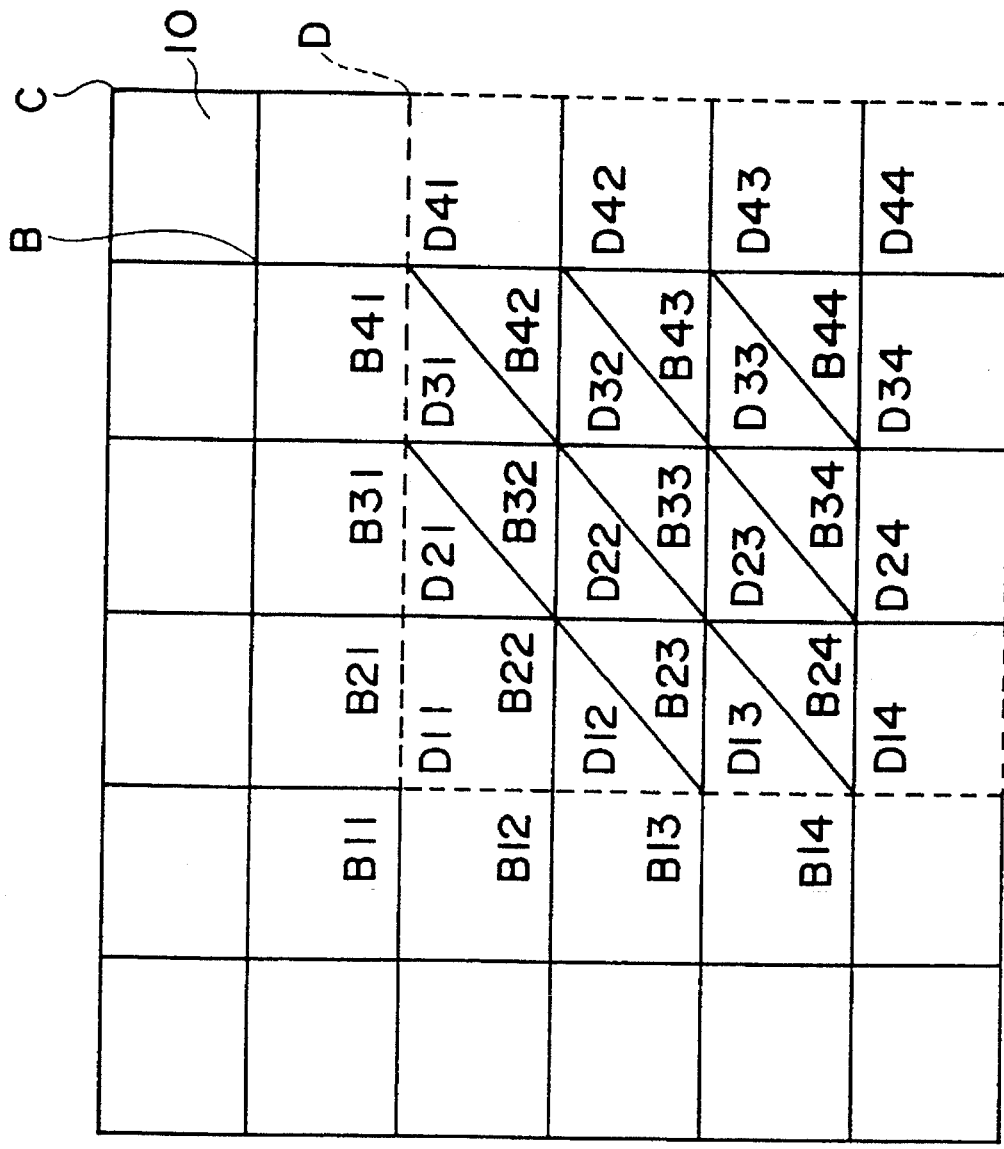
FIG. 14 is a figure showing the relationship between the indices for the color outputs from the follow-up region B and from the detection region D, when residue calculation has been completed.

Next, in the step S206, a decision is made as to whether or not the value of the counter n has yet reached its final value (in the shown example this final value is 10, because there are nine possible positions for the detection region D with respect to the follow-up region B), and if the result of this decision is YES then the flow of control proceeds to the step S207, while if the result of the decision is NO then the flow of control returns to the step S203 and the process described above is repeated. By doing this, residue calculation with respect to the reference image data is repeated while moving the detection region D, and 9 residues are calculated. FIG. 14 is a figure showing the relationship between the indices for the color α outputs $B_{ij}$ from the follow-up region B and the indices for the color α outputs $D_{ij}$ from the detection region D, when residue calculation has been completed.

Next, in the step S207, over n=1 to 9, it is detected which value of n gives the minimum value of $Sum_n$, i.e. the minimum residue. In the next step S208, it is decided that the object to be photographed is present in the detection region D which gives the minimum value of $Sum_n$, and the position of this detection region D is calculated. This FIG. 8 subroutine then terminates and returns control to the main program whose flow chart is shown in FIG. 4B.

(4) Moving the follow-up region and setting the next calculation region for the next iteration In the next step S9 of the FIG. 4B main routine, the follow-up region B is moved to the position of the detection region D which includes the object to be photographed calculated in the subroutine SR2 described above. In this way, a moving object to be photographed is followed up. Further, in this first embodiment, the positions of the follow-up region B for the last two iterations of the main program loop are preserved within the memory, because as shown in FIG. 10 past positions of the follow-up region B are necessary for the calculation of the velocity vector V and of the acceleration vector AC.

Figure 15:
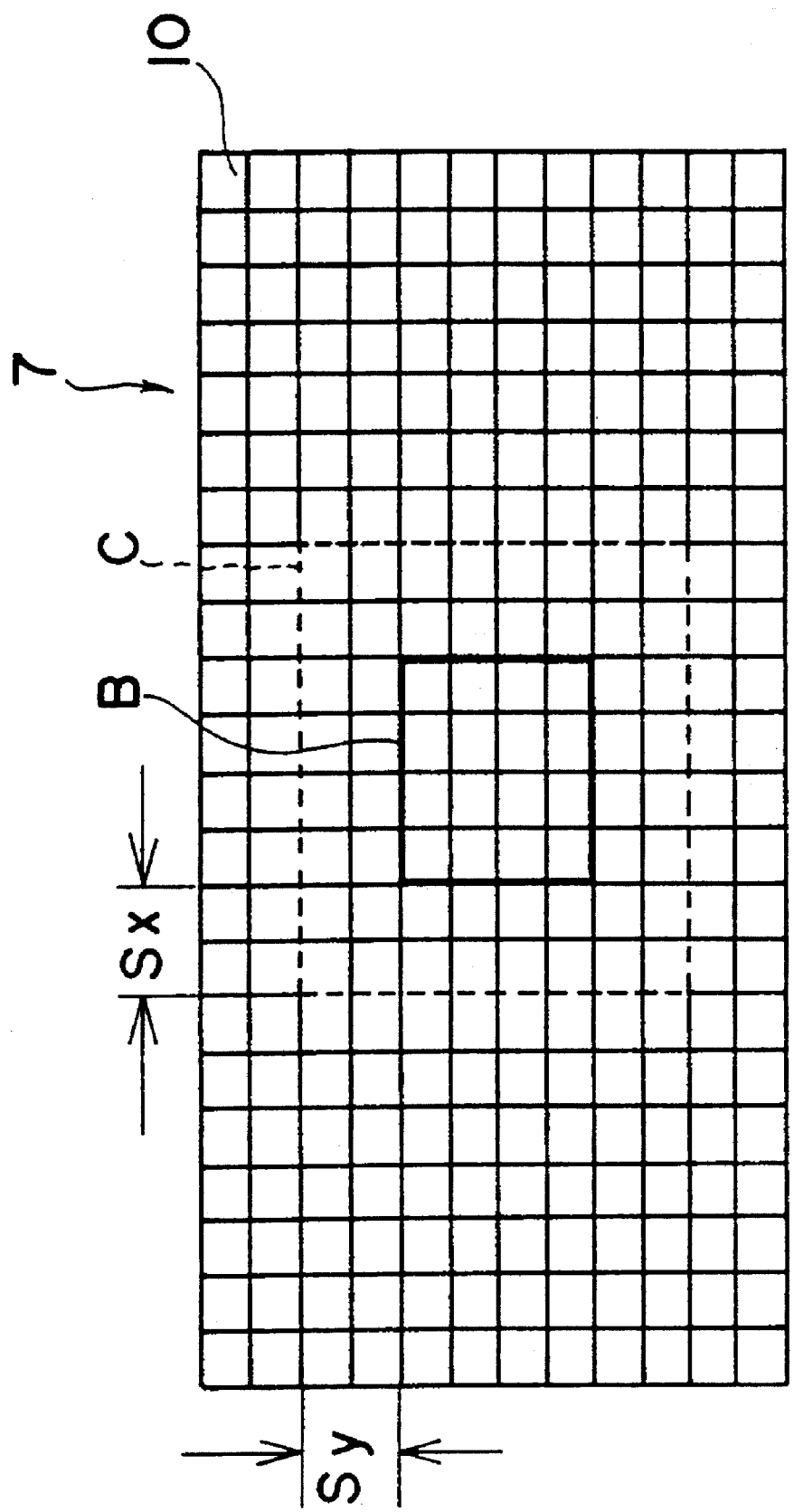
FIG. 15 is a figure for explanation of the procedure for calculation region setting.

Next, in the subroutine step SR3, the calculation region C for the next iteration of the main program loop is set. If, as shown in FIG. 15, the width (expressed in terms of number of imaging elements) in the horizontal direction of the border that appears between the calculation region C and the follow-up region B when they are centered together is termed Sx, and the width in the vertical direction of this border is termed Sy, then the following relationship holds between the number n of repetitions of the residue calculation process and Sx and Sy:

$$n=(2S_x+1)\times(2S_y+1)$$

and, if the calculation region C is made larger so as not to lose sight of the object to be photographed, then the number n of residue calculation process repetitions is increased, and a longer time period is required for the calculation of the position of the object to be photographed, and the paradoxical circumstance arises that as a result, after all, the object to be photographed can be lost sight of. Thus the size of the calculation region C is appropriately set in the subroutine step SR3, based upon the minimum residue which was calculated in the previous subroutine SR2.

Figure 9:
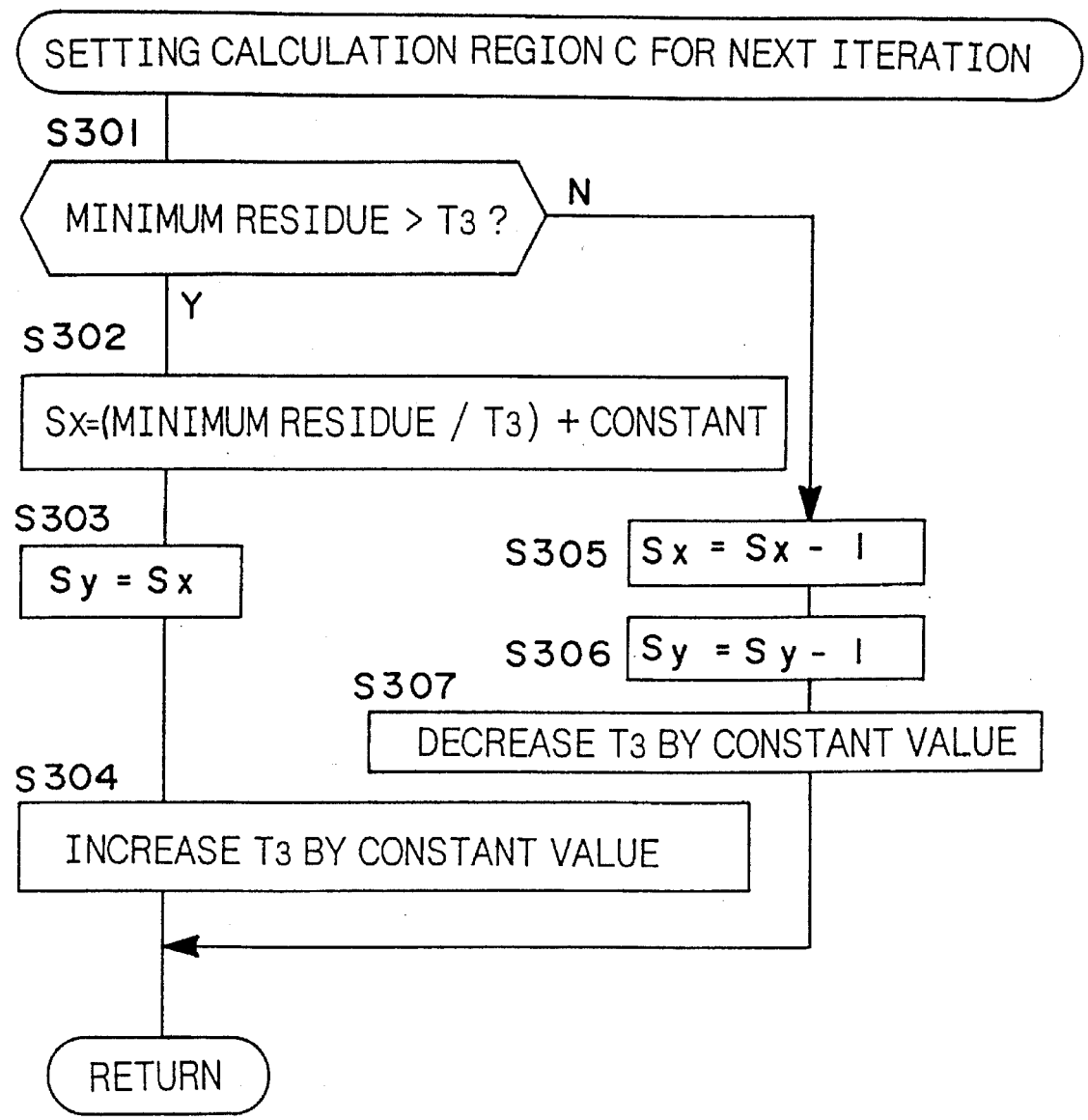
FIG. 9 is a flow chart showing the details of a subroutine SR3 for setting a calculation region C for the next iteration round the main program loop, which is called from the FIG. 4B main program.

The details of this subroutine SR3 for setting the calculation region C for the next iteration around the main program loop are shown in the flow chart of FIG. 9. First, in the decision step 301, a decision is made as to whether or not the minimum residue obtained in the subroutine SR2 is greater than a threshold value $T_3$, and if the result of this decision is YES then the flow of control proceeds to the step S302, while if the result of the decision is NO then the flow of control proceeds to the step S305.

In the steps S302 and S303, since the minimum residue is a value greater than the threshold value $T_3$, it is deemed that the movement activity of the object to be photographed is fairly high, and the process is performed of enlarging the calculation region C. In detail, the horizontal border width Sx and the vertical border width Sy (both expressed in terms of number of imaging elements) for the calculation region C are both set to the value (minimum residue/$T_3$+ constant). Since in the decision step S301 it was decided that the minimum residue is greater than $T_3$, the value of the expression (minimum residue/$T_3$) is greater than 1, and is greater, the greater is the minimum residue. Next, in the step S304, in order to stabilize the size of the enlarged calculation region C, the threshold value $T_3$ is increased by a constant value. After this step, the FIG. 9 subroutine then terminates and returns control to the main program whose flow chart is shown in FIG. 4B.

On the other hand, in the steps S305 and S306, since the minimum residue is a value equal or less than the threshold value $T_3$, it is deemed that the movement activity of the object to be photographed is fairly low, and the process is performed of shrinking the calculation region C by reducing the horizontal border width Sx and the vertical border width Sy by one imaging element each. And next, in the step S307, the threshold value $T_3$ is decreased by a constant value, so as to provide for the further movement activity of the object to be photographed. After this step, the FIG. 9 subroutine again terminates and returns control to the main program.

The horizontal border width Sx and the vertical border width Sy set in the steps S302 and S303, or in the steps S305 and S306, are used for setting the calculation region C in the steps S6 and S8 of the main program of FIG. 4B.

(5) Refreshing the reference image

In the step S10 of the main program, a decision is made as to whether or not the minimum residue which was obtained in the subroutine SR2 is greater than a threshold value $T_3$, and if the result of this decision is YES then the flow of control loops back to the step S3 to perform the process described above again. On the other hand, if the result of the decision is NO, then the flow of control proceeds to the step S11.

In this step S11, the procedure of refreshing the reference image, i.e. of renewing it, is performed. This reference image renewal procedure is performed in order to correspond to continuous change in the object to be photographed, for instance the change from a full frontal view of a face to a profile view. In practice, while the input image data is being inputted, some proportion of the reference image data is renewed including new data. In this step, values given by the following equation:

$$B_{ij}=(1-k)B_{ij}+kD_{ij} \ (i,j=1 \ldots 4)$$

are substituted for the reference image data $B_{ij}$. Here, k should be between 0 and 1 inclusive, and values from about 0.1 to about 0.2 have been found to give good results upon trial. The $D_{ij}$ are the data relating to the detection region D in the subroutine SR2 for which the value $Sum_n$ took the minimum value. However, when the movement of the object to be photographed is chaotic, or in the case that an obstacle passes in front of the object to be photographed, since data not relating to the object to be photographed would undesirably be input if the process of refreshing the reference image were to be performed in these cases, therefore in the step S10 described above the minimum deviation is checked and is found to be larger than the threshold value $T_3$, and accordingly refreshment of the reference image is prohibited. Finally, the flow of control returns to the step S3 and the above described process is repeated.

According to the operation described above, it is possible to follow up the position in the viewfinder screen of the object which is to be photographed by the camera 1. It should be understood that, since in the shown first embodiment the output for the one color α is selected from the RGB output signal from the imaging sensor 7 for calculation of the residue, thereby the time period required for the calculations for detection of the object to be photographed can as a whole be made shorter by comparison to the case in which residue calculation is performed for the entire RGB output signal, and in this manner it is possible rapidly to follow up the position of even a quickly moving object to be photographed, such as the point of attention in a sports scene or the like. Furthermore, since the color α which is selected is that color for which the maximum output is obtained, and since the residue calculation is performed using the output signal for that color α, thereby it is possible to choose the most distinctive one of the colors for detection of the object to be photographed, and by this selection of the most appropriate color output signal diminution of the amount of information is compensated for and accurate position detection is made possible.

Further, since the reference image data is partially refreshed when the position of the target is detected, thereby even if the form of the object to be photographed changes continuously or if brightness of the object to be photographed changes, it is possible accurately and reliable to capture the object to be photographed, and accordingly accurate position detection is made possible.

Moreover, in the shown first embodiment of the present invention, the calculation region C is provided within the visual region A of the imaging sensor 7, the speed and the acceleration of the object to be photographed are measured, and the next position of the calculation region C is predicted. In addition, the size of the calculation region C is appropriately controlled according to the magnitude of the minimum residue. By doing this, it is possible to prevent the situation in which the object to be photographed is lost sight of, as was the problem with the examples of the prior art which were discussed above, and stable, reliable and accurate following up of the object to be photographed is made possible. Accordingly, the fact that it becomes unnecessary to obtain the residue for the entire screen is also very helpful, and it is possible rapidly to follow up the position of even a quickly moving object to be photographed, such as the point of attention in a sports scene or the like.

Variants of First Embodiment

The manner in which the color selection process is performed is not limited to the one shown and discussed above with reference to FIG. 5, in which the color α which provides the maximum output is selected; other possibilities are also available.

Figure 16:
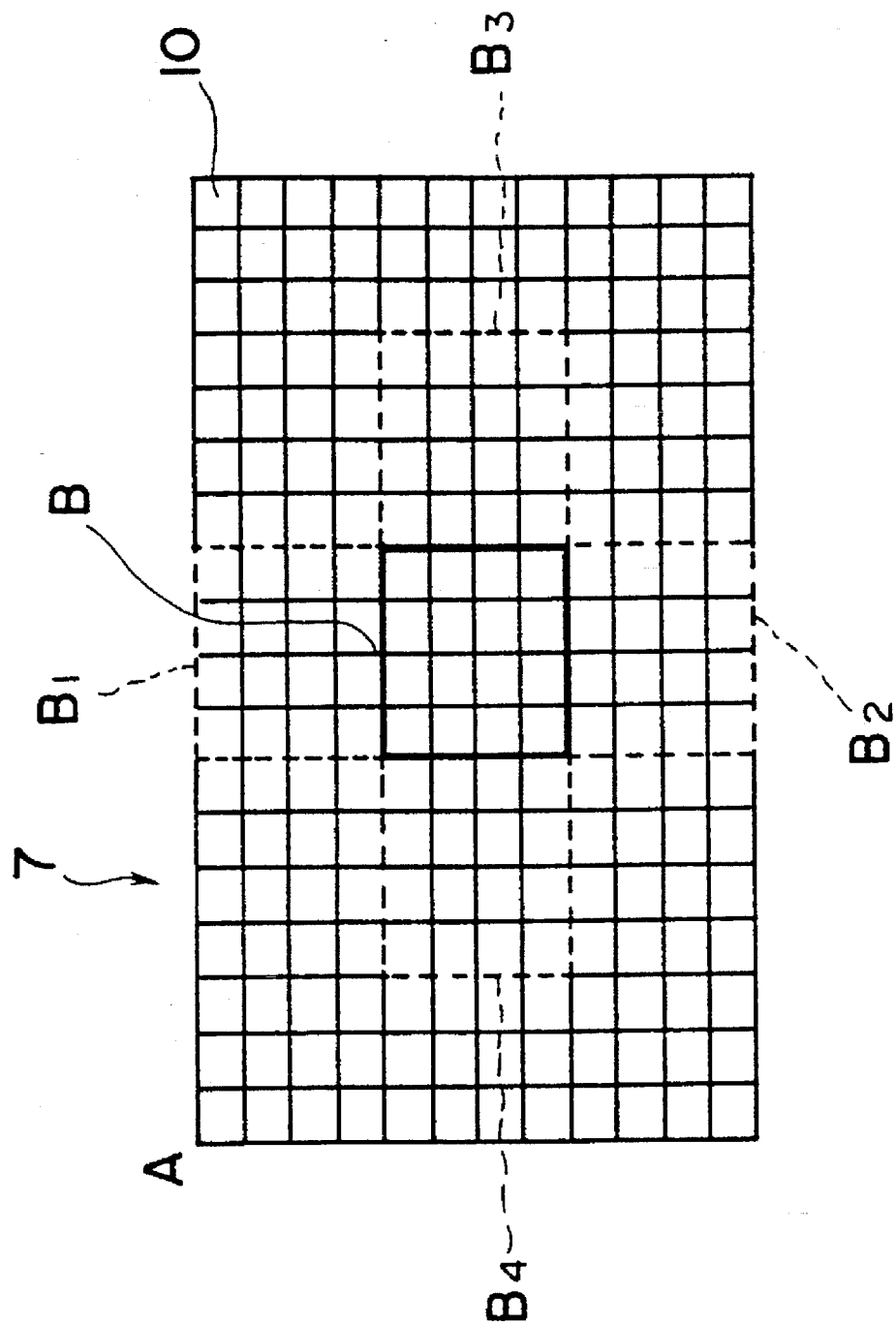
FIG. 16 is a figure showing the positional relationships between the follow-up region B and four neighboring regions used for the second version of the color selection subroutine SR1, whose flow chart is shown in FIG. 6.

FIG. 6 is a flow chart for a second version of the color selection subroutine SR1. In the first step S401, the RGB outputs of each imaging element obtained in the step S1 for the follow-up region B are summed over each of the three colors R, G, and B. Next, in the step S402, the RGB outputs for each imaging element are likewise summed for each of the three colors R, G, and B over four neighboring regions B1 through B4, which are defined as shown in FIG. 16 which shows the positional relationships between the follow-up region B and these four neighboring regions B1 through B4, each being a 4×4 rectangle of imaging elements just like the follow-up region B, and neighboring the follow-up region B on its upper side, on its lower side, on its right side, and on its left side respectively. And, finally, in the step S403, for each of the colors R, G, and B, the differences between the total in the follow-up region B obtained in the step S401 and the totals in each of the four neighboring regions B1 through B4 obtained in the step S402 are calculated and the absolute values of these differences are added together, and that color is selected which produces Z5 the maximum result. This second FIG. 6 version of the subroutine SR1 then terminates and returns control to the main program whose flow chart is shown in FIG. 4A.

Figure 7:
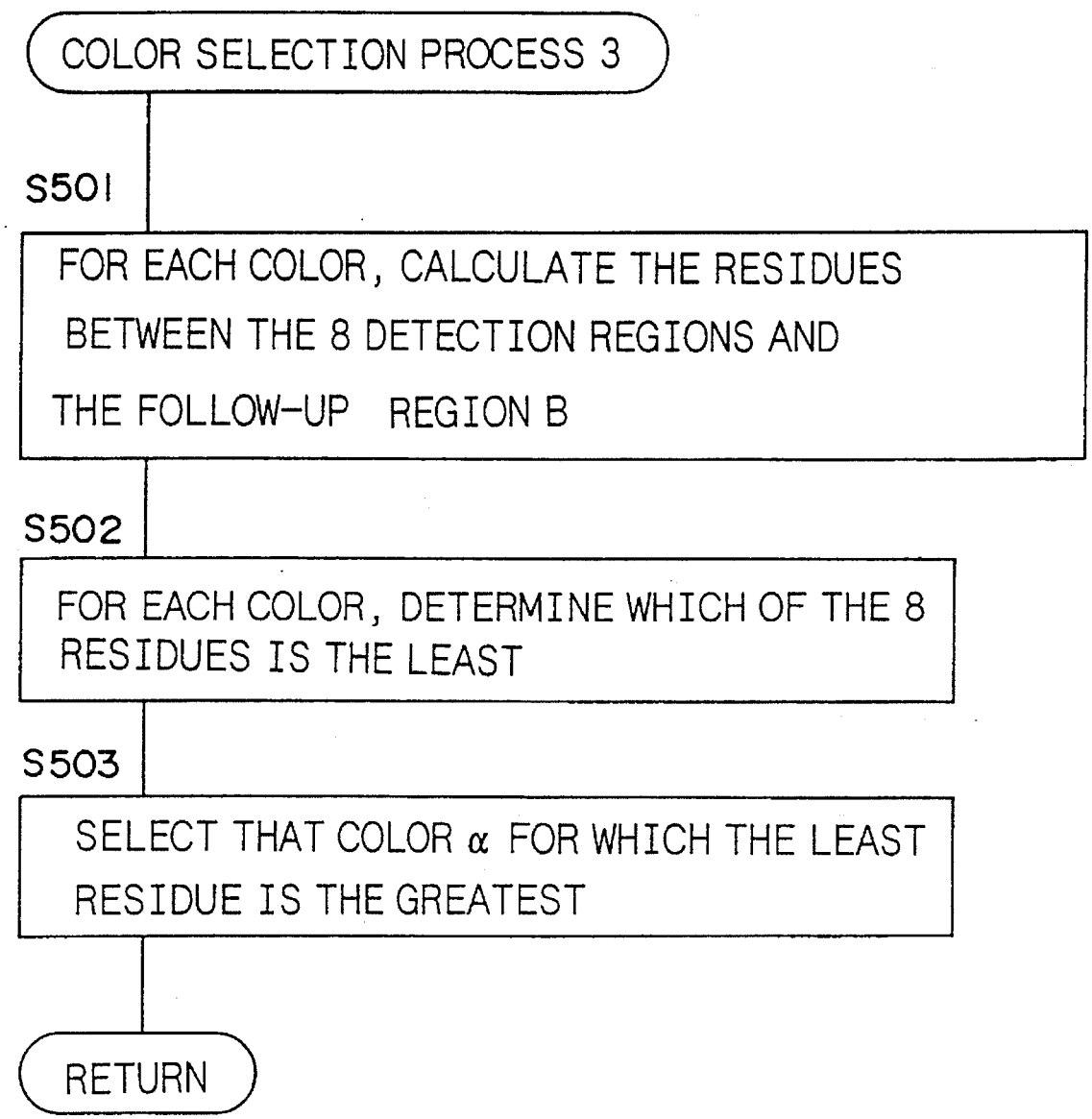
FIG. 7 is a flow chart for a third version of this color selection subroutine SR1.
Figure 8:
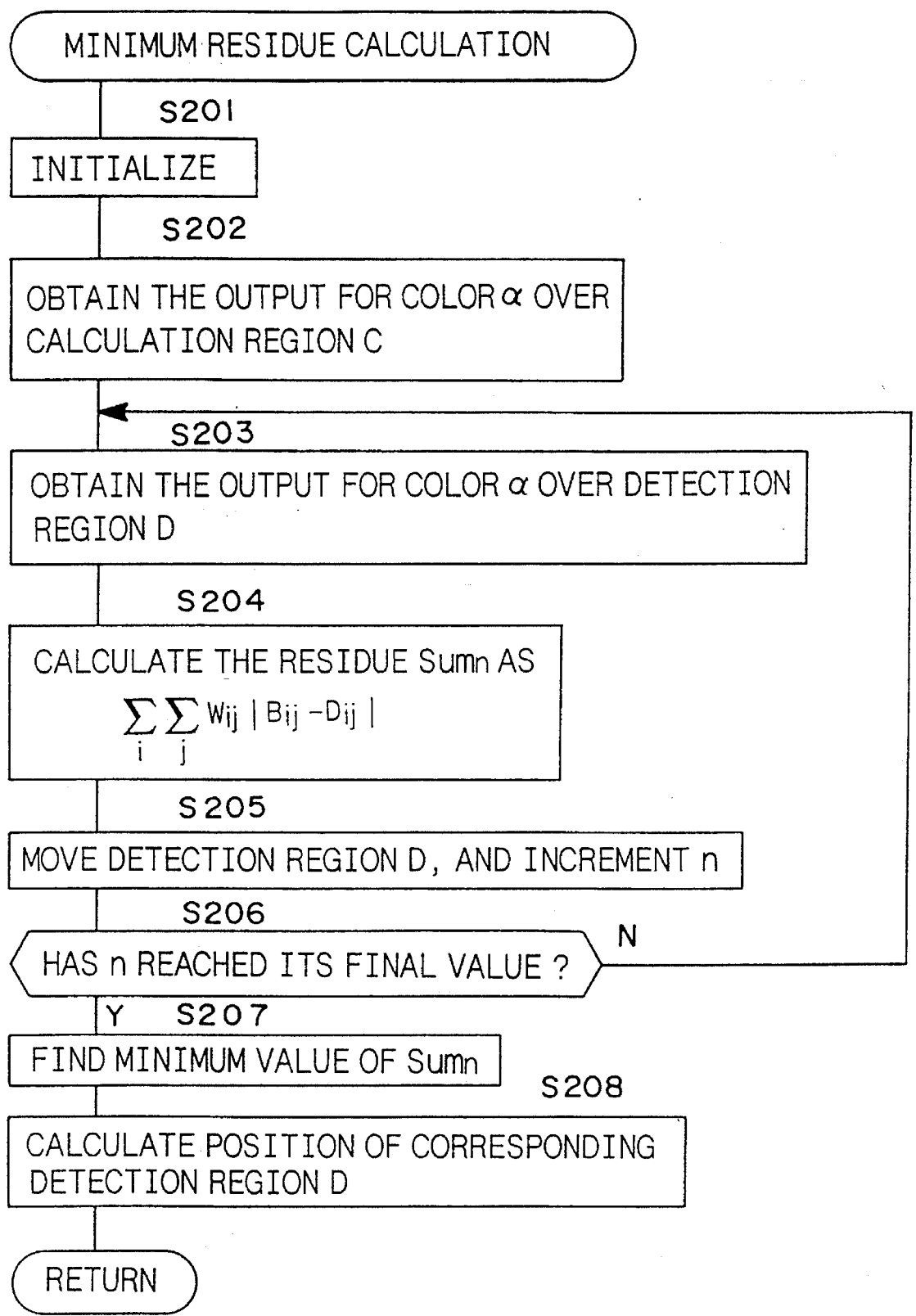
FIG. 8 is a flow chart showing the details of a subroutine SR2 for minimum residue calculation, which is called from the FIG. 4B main program.

FIG. 7 is a flow chart for a third version of the color selection subroutine SR1. In the first step S501, first, eight detection regions are defined, each being a 4×4 rectangle of imaging elements just like the follow-up region B, and each being displaced from the follow-up region B by one imaging element, respectively upwards, downwards, rightwards, leftwards, diagonally upwards and rightwards, diagonally downwards and rightwards, diagonally upwards and leftwards, and diagonally downwards and leftwards. And then the RGB outputs of each imaging element for these eight detection regions and for the follow-up region B are summed over each of the three colors R, G, and B, and the differences (the residues) between the total in the follow-up region B and the totals in each of the eight detection regions are calculated for each of the three colors R, G, and B. Next, in the step S502, for each color, it is determined which one of the eight residues has the minimum value. Finally, in the step S503, that color (R, G, or B) is selected, for which the minimum value residue determined in the step S502 is the greatest. This third FIG. 7 version of the subroutine SR1 then terminates and returns control to the main program whose flow chart is shown in FIG. 4A.

Now, it is not essential to the present invention for the reference image data used as a template to be sampled before following up of the object as was the case with the shown first embodiment; provided that it is possible to known the form etc. of the target in advance, it is also acceptable for reference image data relating to the target to be stored in the memory beforehand. In the same manner, it is not essential to the present invention for the input image data to be input in a real time fashion; it is also acceptable for it to be previously recorded data.

Further, although in the shown first embodiment the setting of the calculation region was performed using both the velocity vector and the acceleration vector, it would also be acceptable to use only the one or the other of these. In the case of using the acceleration vector, since if the acceleration vector is zero this means that the target is moving at a constant velocity, therefore if the acceleration and the initial velocity are detected it is possible to set both the position and the size of the calculation region appropriately.

Second Embodiment

Figure 17:
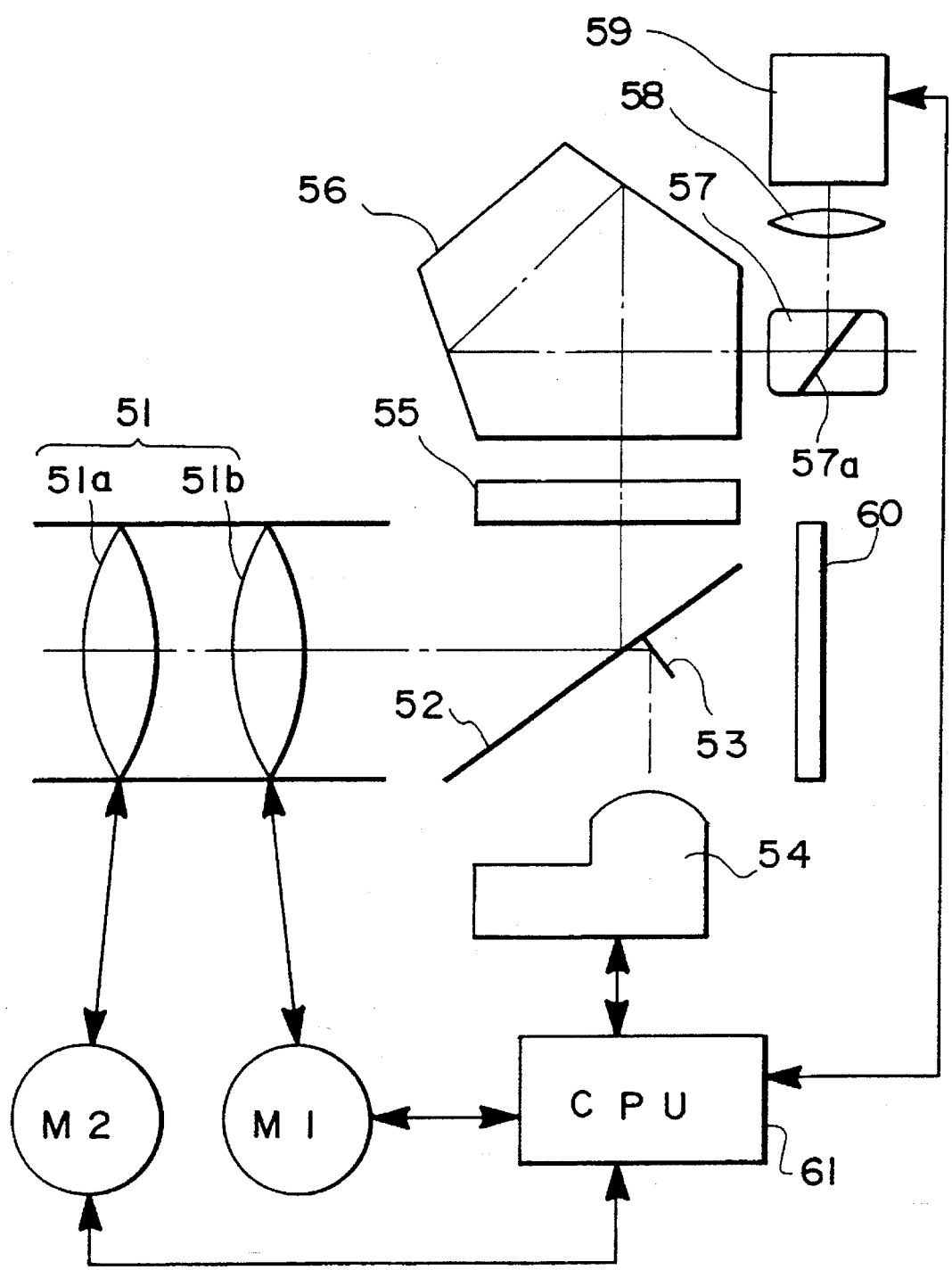
FIG. 17 is a schematic side view of a camera incorporating a target follow-up device which is a second embodiment of the present invention.

FIG. 17 is a schematic side view of a camera incorporating a target follow-up device which is a second embodiment of the present invention.

Referring to this figure, a portion of the light that passes through a photographic lens 51 also passes through a main mirror 52 and is reflected off a sub-mirror 53 onto a focus detection device 54, while the remainder of the light is reflected off the main mirror 52, passes through a focus screen 55, is deflected by passing through a pentaprism 56, and then enters the eye (not shown) of the user of the camera via an eyepiece lens 57. Further, a portion of this light which has passed through the pentaprism 56 is deflected by a half silvered mirror 57a, is refocused by a lens 58, and falls on a light receiving unit 59 which is for detecting the object to be photographed. The reference symbol 60 denotes a shutter device.

The photographic lens 51 comprises a focusing lens group 51a and a zooming lens group 51b. The focusing lens group 51a is axially driven by a motor M2 according to a focus detection signal which is calculated and output by a CPU 61, based upon the output signal from the focus detection device 54. Further, the zooming lens group 51b is axially driven by a motor M1 via the CPU 61, based upon a signal from a control switch described hereinafter which is for setting the magnification for photography; and focal length to which the combination of the focusing lens group 51a and the zooming lens group 51b is focused is varied according to this driving of the zooming lens group 51b.

FIG. 18 is a block diagram of the camera shown in FIG. 17. As shown in this figure, the light receiving unit 59 for detecting the object to be photographed comprises a light receiving device 59a which is made up from (for example) several hundred imaging elements, and a processing circuit 59b which processes the output signals from these imaging elements of the light receiving device 59a and outputs them to the CPU 61. Color filters of the three different colors R (red), G (green), and B (blue) are fitted over the imaging elements of the light receiving device 59a, and thereby an RGB output signal corresponding to the object to be photographed is produced.

As shown in FIG. 18, the focus detection device 54 comprises a focus detection element 54a which can detect focus position for a plurality of areas (the focus detection regions) in the photographic field of view (in the figure there are shown, by way of example, five areas for which the focus position can be detected), and a processing circuit 54b which performs A/D conversion processing etc. on the output signal of this focus detection element 54a and outputs a signal to the CPU 61.

The reference symbol 70 denotes a photographic mode selection unit, which can be used by the camera user to set the mode for performing photography—for example, either a sports photography mode for taking sports photographs in which the most suitable exposure control method for performing sports photography is used, or a portrait photography mode in which the most suitable exposure control method for performing portrait photography is used. This photographic mode selection unit 70 comprises a plurality of control switches provided on the outer casing of the camera for the various photographic modes (in the figure, only a sports photography mode switch SW70a and a portrait photography mode switch SW70b are exemplarily indicated), and circuitry not particularly shown in the figure. The appropriate control switch is operated according to the photographic mode desired, and a signal indicating the photographic mode thereby selected is sent from the photographic mode selection unit 70 to the CPU 61, so as to set the desired photographic mode.

The reference symbol 71 denotes a focus detection mode changeover unit, which can be used by the camera user to set the mode for focus detection—for example, either a one shot mode (S-AF mode) in which based upon the output from the focus detection device 54 once after detecting the condition in which the photographic lens 51 is on focus, the movement of the photographic lens 51 is stopped, or a continuous mode (C-AF mode) in which based upon the output from the focus detection device 54 the focus adjustment operation of the focusing lens group 51a is repeatedly performed, or a multi mode (M-AF mode) in which based upon the output from the focus detection device 54 focus detection can be performed independently for each of a plurality of areas in the photographic field of view. In more detail, in this second embodiment of the present invention, this multi or M-AF mode is a mode in which focus detection is performed independently for each of a plurality of areas in the photographic field of view, and the focus adjustment operation is then performed for the most suitable one of this plurality of focus detection areas. Exemplarily, that one of the plurality of focus detection areas which is determined to be at the closest photographic distance may serve as the most suitable one. On the other hand, in the one shot or S-AF mode or the continuous or C-AF mode, the user of the camera chooses one area from the plurality of focus detection areas provided on the focus detection device 54, and the focus adjustment operation is then performed for this selected focus detection area. This focus detection mode changeover unit 71 comprises a plurality of control switches provided on the outer casing of the camera for the various focus detection modes (in the figure, only a S-AF mode switch SW71a, a C-AF mode switch SW71b, and a M-AF mode switch SW71c are exemplarily indicated), and circuitry not particularly shown in the figure. The appropriate control switch is operated according to the focus detection mode desired, and a signal indicating the focus detection mode thereby selected is sent from the focus detection mode changeover unit 71 to the CPU 61, so as to set the desired focus detection mode. In the following description, the focus detection mode will in the interests of brevity also be referred to as the AF mode.

The reference symbol 72 denotes a predetermined magnification photographic mode setting unit which can be used by the camera user to set the so called auto zoom mode, i.e. the mode for automatically driving the zooming lens group 51b according to change in the photographic distance so as to ensure that the photographic magnification always maintains a value which is determined in advance. This predetermined magnification photographic mode setting unit 72 comprises a plurality of control switches provided on the outer casing of the camera for the various possible preset photographic magnifications available (in the figure, only a first magnification switch SW72*a* and a second magnification switch SW72*c* are exemplarily indicated). The appropriate control switch is operated according to the photographic magnification desired, and a signal indicating the photographic magnification thereby selected is sent from the predetermined magnification photographic mode setting unit 72 to the CPU 61, so as to set the desired photographic magnification.

The reference symbol 73 denotes a follow-up area designation member 73, which is constructed so as to operate together with the photographic mode selection unit 70, the focus detection mode changeover unit 71, and the predetermined magnification photographic mode setting unit 72 described above. This follow-up area designation member 73, as shown in FIG. 18, normally detects characteristic information (a color difference signal, a luminance signal, or the like) relating to the object to be photographed in the follow-up area 55*b* set in the central portion of the photographic field of view 55*a* and outputs such information to the CPU 61, and further instructs the CPU 61 to follow up the object to be photographed which possesses such detected characteristic information to be followed up in the photographic field of view 55*a*. Such a color difference signal or luminance signal may be defined, for example, according to the NTSC (National Television Systems Committee) format, which is one of several standard television formats. For reference, according to the NTSC format, the following relationships hold between the color difference signals and luminance signals and the RGB output signals:

| Luminance signal $Y$: | $Y$ | = | $0.59G + 0.30R + 0.11B$ |
|---|---|---|---|
| Color difference signal $R$-$Y$: | $R$-$Y$ | = | $0.70R - 0.59G - 0.11B$ |
| Color difference signal $G$-$Y$: | $G$-$Y$ | = | $0.41G - 0.30R - 0.11B$ |
| Color difference signal $B$-$Y$: | $B$-$Y$ | = | $0.89B - 0.59G - 0.30R$ |

Further, the follow-up area designation member 73 is so constructed as to make it possible for the user of the camera to manually indicate the object to be photographed which is to be followed up. That is to say, the follow-up area designation member 73 can freely set the position of the follow-up area 55*b* anywhere within the photographic field of view 55*a*, and for example may consist of a pointing device such as a trackball or the like by which the follow-up area 55*b* can be moved. This follow-up area designation member 73 extracts the characteristic information relating to the object to be photographed within the follow-up area 55*b*, based upon the output of the light receiving unit 59 for discriminating the object to be photographed, and outputs this information to the CPU 61. Furthermore, it is so arranged that the position of the follow-up area 55*b* within the photographic field of view 55*a* can be visually checked by the user of the camera, for example by the use of a liquid crystal means of transparent type provided on the focus screen 55.

The CPU 61 comprises a microcomputer, a memory device, and other associated elements of a per se conventional type, not particularly shown, and starts follow-up action for the object to be photographed according to orders received from the follow-up area designation member 73. Further, since the characteristic information (such as a color difference signal) relating to the object to be photographed within the follow-up area 55*b* is extracted by the follow-up area designation member 73, the CPU 61 records in its memory device the color difference signal (or the like) from the follow-up area 55*b* which is designated on the screen, and, by comparing this recorded color difference signal and the color difference signal around the perimeter of the designated follow-up area 55*b*, detects what position on the photographic field of view 55*a* the principal object to be photographed has moved to.

In the following, the control operation of the camera according to this second embodiment will be explained with reference to the flow charts shown in FIGS. 19 through 25.

(1) The main routine

The flow chart of FIG. 19 describes the flow of a main routine of the program executed by the CPU 61. The execution of this main routine of FIG. 19 is started, for example, at the time point when a main switch (not particularly shown) of the FIG. 17 camera is operated to switch the power source of the camera on.

First, in the step S21, various initialization settings are performed for various control variables etc. of the program and for various functions of the camera. Then, in the next subroutine step SR11, the desired photographic mode is selected by the user of the camera via the photographic mode selection unit 70, and exposure calculation is performed according to this selected photographic mode. This subroutine SR11 will be described in detail hereinafter with reference to the flow charts of FIG. 20A and FIG. 20B.

Next, in the subroutine SR12, the desired photographic magnification is selected by the user of the camera via the predetermined magnification photographic mode setting unit 72, and various control functions are performed according to this selected photographic magnification. This subroutine SR12 will be described in detail hereinafter with reference to the flow chart of FIG. 21.

Next, in the subroutine SR13, the desired focus detection mode is selected by the user of the camera via the focus detection mode changeover unit 71, and various control functions are performed according to this selected focus detection mode. This subroutine SR13 will be described in detail hereinafter with reference to the flow chart of FIG. 22.

Next, in the decision step S22, a decision is made as to whether or not the release button of the camera (not particularly shown) is being operated, and if the result of this decision is YES then it is judged that a shutter release order is being issued and the flow of control proceeds to the step S23 and photography is performed according to a per se known exposure control sequence, while on the other hand if the result of the decision is NO then the flow of control loops back to return to the step S21.

(2) Setting the photographic mode

Two versions of the details of the subroutine SR11 called from the flow chart of FIG. 19 are shown in the flow charts of FIG. 20A and FIG. 20B, and FIG. 27A and FIG. 27B. These flow charts will be used for explaining the flow of control operation in the case that the most suitable exposure control mode is set for when the photographic mode is the sports photography mode or the like for when the object to be photographed is a moving object.

(a) A first example of control

FIG. 20A and FIG. 20B are flow charts for showing a first example of control for setting the photographic mode.

First, in the step S601, a decision is made as to whether or not a photographic mode suitable for photography of an object which is moving, such as the sports photography mode or the like, is being commanded by the operation of the control switches of the photographic mode selection unit 70; and, if such a photographic mode suitable for photography of an object which is moving, such as the sports photography mode or the like, is being commanded, then the flow of control proceeds to the step S602; while, if a photographic mode suitable for photography of an object which is stationary, such as the portrait photography mode or the like, is being commanded, then the flow of control proceeds to the step S608.

In the step S602, the CPU 61 sets the photographic mode according to the input signal from the photographic mode selection unit 70 which is commanding the sports photography mode or the like, and also sets the target object follow-up operational mode. Next, in the step S603, the follow-up area designation member 73 picks out the characteristic information for the object to be photographed which is positioned within the follow-up area 55b which is itself set at a predetermined position within the photographic field of view 55a, and the CPU 61 records this characteristic information, i.e. the color difference signal, in its memory.

Next, in the step S604, the color difference signal recorded in the memory of the CPU 61 and the color difference signal around the perimeter of the designated follow-up area 55b are compared, and it is determined what position on the photographic field of view 55a the principal object to be photographed has moved to. As for the details of this detection procedure, only an abbreviated description will be given in this specification, since they are disclosed in (for example) U.S. Pat. No. 5,031,049. In summary, taking the R-Y color difference signal and the B-Y color difference signal to be respectively the vertical axis and the horizontal axis, the coordinates of the color difference signals for each imaging element are plotted on a plane, and by moving the coordinates the direction of movement of the principal object to be photographed is determined.

Next, in the step S605, photometric calculation processing is performed for the photographic field of view 55a which puts the weight on the measured light values of the region in which the principal object to be photographed is present. Since this type of photometric processing is per se known in the art, its details will not be explained in this specification. Next, in the step S606, an exposure control value is calculated based upon the result of this photometric calculation processing, and after this the subroutine SR11 then terminates and returns control to the main program whose flow chart is shown in FIG. 19.

On the other hand, if the flow of control is directed to the step S608, then, since it has been decided in the decision step S601 that the sports photography mode or the like is not being commanded, therefore the CPU 61 sets the photographic mode to the portrait photography mode or the like, according to the input signal from the photographic mode selection unit 70.

Next, in the step S609, the light from the object to be photographed which is positioned in the central portion of the photographic field of view 55a is received by the light receiving unit 59 for discriminating the object to be photographed. In a photographic mode suitable for photography of an object which is stationary, normally, since it often happens that the principal object to be photographed is located in the central portion of the photographic field of view 55a, therefore the form of the object to be photographed which exists in the central portion of the photographic field of view 55a is discriminated, and it is beneficial to perform photometry by placing weight on this discriminated region. Next, in the step S610, photometric calculation processing is performed which puts the weight upon the measured light values of the central portion of the photographic field of view 55a, i.e. upon the region in which the principal object to be photographed is decided to be present. Next, in the step S611, an exposure control value is calculated based upon the result of this photometric calculation processing, and after this the subroutine SR11 then terminates and returns control to the main program whose flow chart is shown in FIG. 19.

(b) A second example of control

It is also possible to change the above described steps S602 through S606 as will now be described. To wit, in the second example of control shown in the flow chart of FIG. 27A, instead of the steps S602 through S606, the steps S620 through S623 are substituted, and except for this alteration the control process for this FIG. 27A and FIG. 27B flow charts is the same as for the FIG. 20A and FIG. 20B flow charts.

In the step S620, the CPU 61 sets the photographic mode according to the input signal from the photographic mode selection unit 70 which is commanding the sports photography mode or the like, and also sets the target object follow-up operational mode. Further, the CPU 61, if the focus detection mode is set to the one shot mode (S-AF mode), changes the focus detection mode to the continuous mode (C-AF mode) or the multi mode (M-AF mode).

To describe this process in more detail, if the camera is provided with both of the two focus detection modes—the continuous mode (C-AF mode) and the multi mode (M-AF mode)—then a changeover is performed from the continuous mode (C-AF mode) to the multi mode (M-AF mode). Further, if the camera is provided with all three of the focus detection modes—the one shot mode (S-AF mode), the continuous mode (C-AF mode), and the multi mode (M-AF mode)—then a changeover is performed from either the one shot mode (S-AF mode) or the continuous mode (C-AF mode) to the multi mode (M-AF mode).

Next, in the step S621, a process of follow-up control for the object to be photographed identical to that performed previously in the step S604 is performed. And next, in the step S622, that focus detection region is selected which is nearest to the region in which the object to be photographed which has been followed up exists (the area is selected from the five areas of the focus detection element 54a for which focus detection is possible), and focus adjustment control is performed so as always to follow up the object to be photographed.

Next, in the step S623, an exposure control value is calculated in a fashion identical to that performed previously in the steps S605 and S606, and after this the subroutine SR11 then terminates and returns control to the main program whose flow chart is shown in FIG. 19.

(3) Setting the predetermined magnification photographic mode

Figure 21:
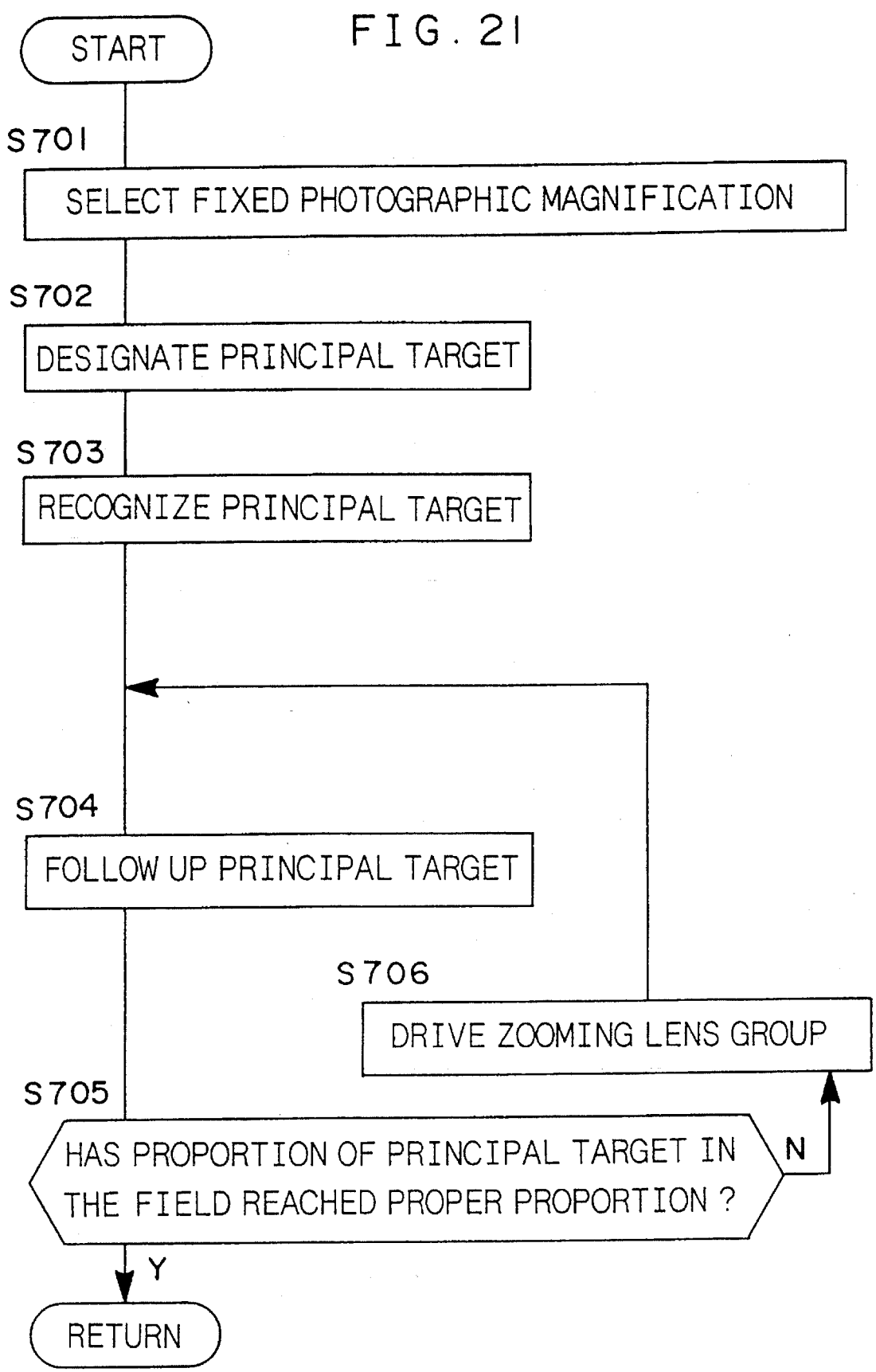
FIG. 21 is a flow chart for explaining a first version of a subroutine SR12 of the program executed by the CPU 61 for selecting a predetermined magnification ratio photographic mode.
Figure 22:
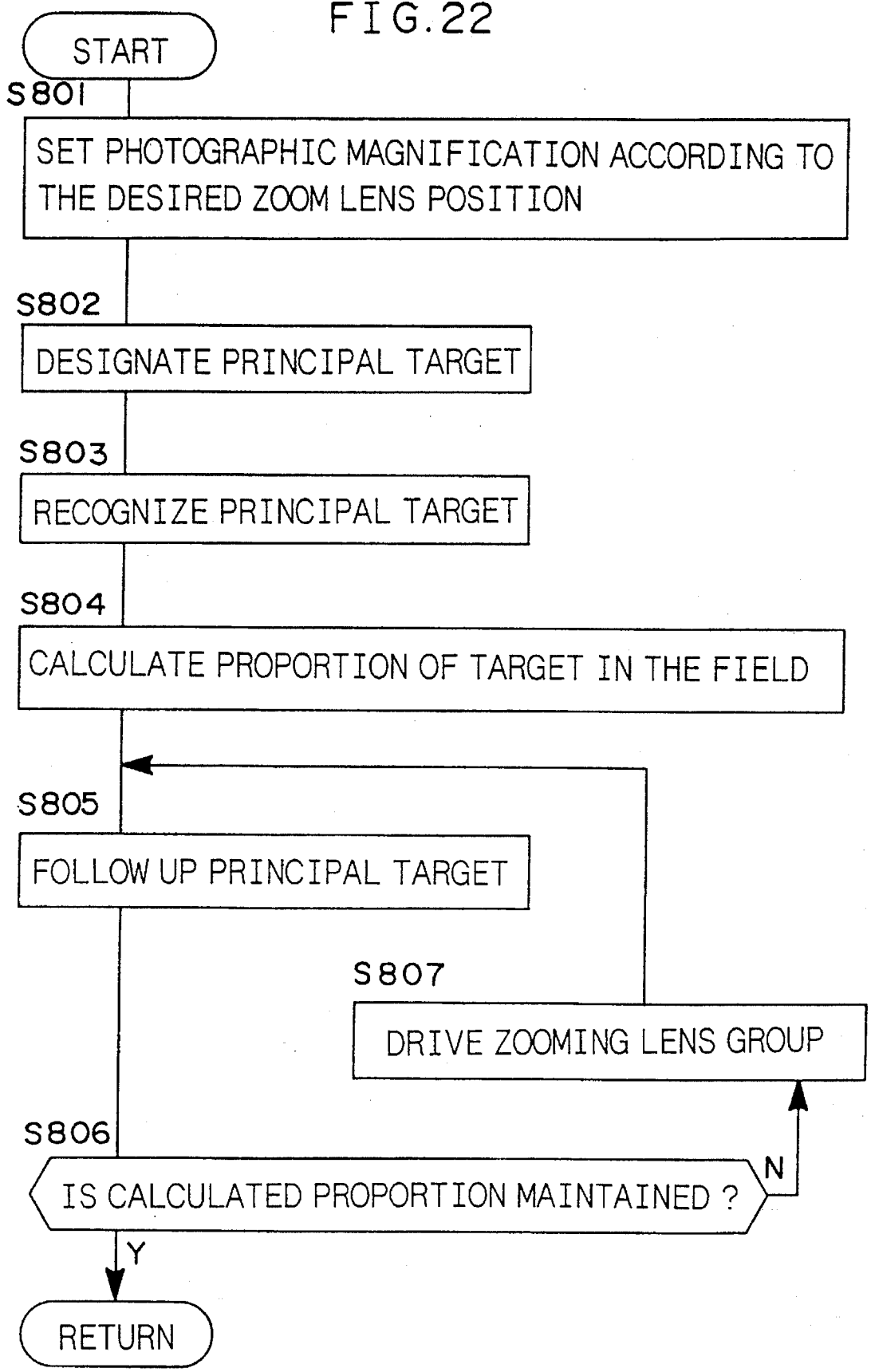
FIG. 22 is a flow chart for explaining a second version of this predetermined magnification ratio photographic mode selecting subroutine SR12.

The flow charts of FIGS. 21 and 22 serve for explaining two different versions of the subroutine SR12 of FIG. 19. The flow charts of FIGS. 21 and 22 are for explaining the flow of control when a predetermined magnification is set by the predetermined magnification photographic mode setting unit 72. When a predetermined magnification photographic mode is set, zooming action is performed while maintaining a previously determined photographic magnification.

(a) A first example of control

With the first example of control shown in the FIG. 21 flow chart for setting the predetermined magnification photography mode, one magnification is set from among a plurality of photographic magnifications, and zooming drive control is automatically performed so as to keep the magnification as set, even if the object to be photographed moves.

First, in the step S701, a signal is input to the CPU 61 indicating which photographic magnification is being selected via the control switches of the predetermined magnification photographic mode setting unit 72, and thereby the CPU 61 sets that chosen photographic magnification from among the plurality of available photographic magnifications. And, based upon the selected photographic magnification, the CPU 61 determines the proportion which the principal object to be photographed occupies of the photographic field of view. For each of the available photographic magnifications, there is recorded in the memory of the CPU 61 the most suitable proportion for the principal object to be photographed to occupy in the photographic field of view. For example, for the portrait photographic mode, the proportion which the principal object to be photographed occupies of the photographic field of view is about 30% to 40%. It is appropriate to determine this proportion by experiment according to the photographic magnification which is to be maintained.

Next, in the step S702, the principal object to be photographed is designated within the follow-up area 55b by actuation of the follow-up area designation member 73. And next, in the step S703, based upon the characteristic information for the principal object to be photographed designated in the follow-up area 55b, the form of the principal object to be photographed within the photographic field of view 55a is inferred, and is recognized. The procedure for inference and recognition of the principal object to be photographed may be suitably selected from various per se known methods; for example, the form of the principal object to be photographed may be inferred and recognized by grouping its characteristic information, or the procedure for its recognition may be that the characteristic forms of principal objects to be photographed (the angular portions of their contours and the like) may be previously stored in the memory as templates, so that according to the characteristic information a procedure or the like of matching with the templates can be implemented. Next, in the step S704, based upon the form of the principal object to be photographed which was inferred and recognized in the step S703, it is detected to what position in the photographic field of view 55a the principal object to be photographed has moved.

Next, in the decision step S705, based upon the form of the principal object to be photographed which was recognized in the step S703, the proportion which the principal object to be photographed actually occupies of the photographic field of view is calculated, and this calculated proportion is compared with the proportion previously selected in the step S701 according to the set photographic magnification. If these proportions are substantially equal, then this subroutine SR12 terminates and returns control to the main program whose flow chart is shown in FIG. 19; while, if the proportions are not substantially equal, the flow of control proceeds to the step S706.

In this step S706, the zooming lens group 51b of the photographic lens 51 is driven in such a manner as to establish the predetermined photographic magnification. After this, the flow of control returns to the step S704.

(b) A second example of control

With the second example of control shown in the FIG. 22 flow chart for setting the predetermined magnification photography mode, after a zoom position is designated by the photographer, drive control is performed so as to subsequently maintain the detected photographic magnification.

First, in the step S801, the system waits until the zooming lens group 51b of the photographic lens 51 is driven to the position desired by the photographer, and then the photographic magnification is determined by this zoom position.

Next, in the step S802, the principal object to be photographed is designated within the follow-up area 55b. And next, in the step S803, based upon the characteristic information for the principal object to be photographed designated in the follow-up area 55b, the form of the principal object to be photographed within the photographic field of view 55a is inferred, and is recognized. Next, in the step S804, based upon the form of the principal object to be photographed which was inferred and recognized in the step S803, the proportion which the principal object to be photographed actually occupies of the photographic field of view is calculated.

Next, in the step S805, the position in the photographic field of view 55a to which the principal object to be photographed has moved is followed up. And next, in the step S806, it is detected whether the proportion which the principal object to be photographed occupies of the photographic field of view, as calculated in the step S804, has changed according to movement of the object to be photographed, or has not changed. According to the result, if the proportion occupied by the principal object to be photographed has not changed, then this subroutine SR12 terminates and returns control to the main program whose flow chart is shown in FIG. 19; while, if the proportion occupied by the principal object to be photographed has changed, then the flow of control passes next to the step S807.

In this step S807, the zooming lens group 51b of the photographic lens 51 is driven so as to bring the photographic magnification to the predetermined value. After this, the flow of control returns to the step S805 again.

(4) Setting the AF mode

Figure 23:
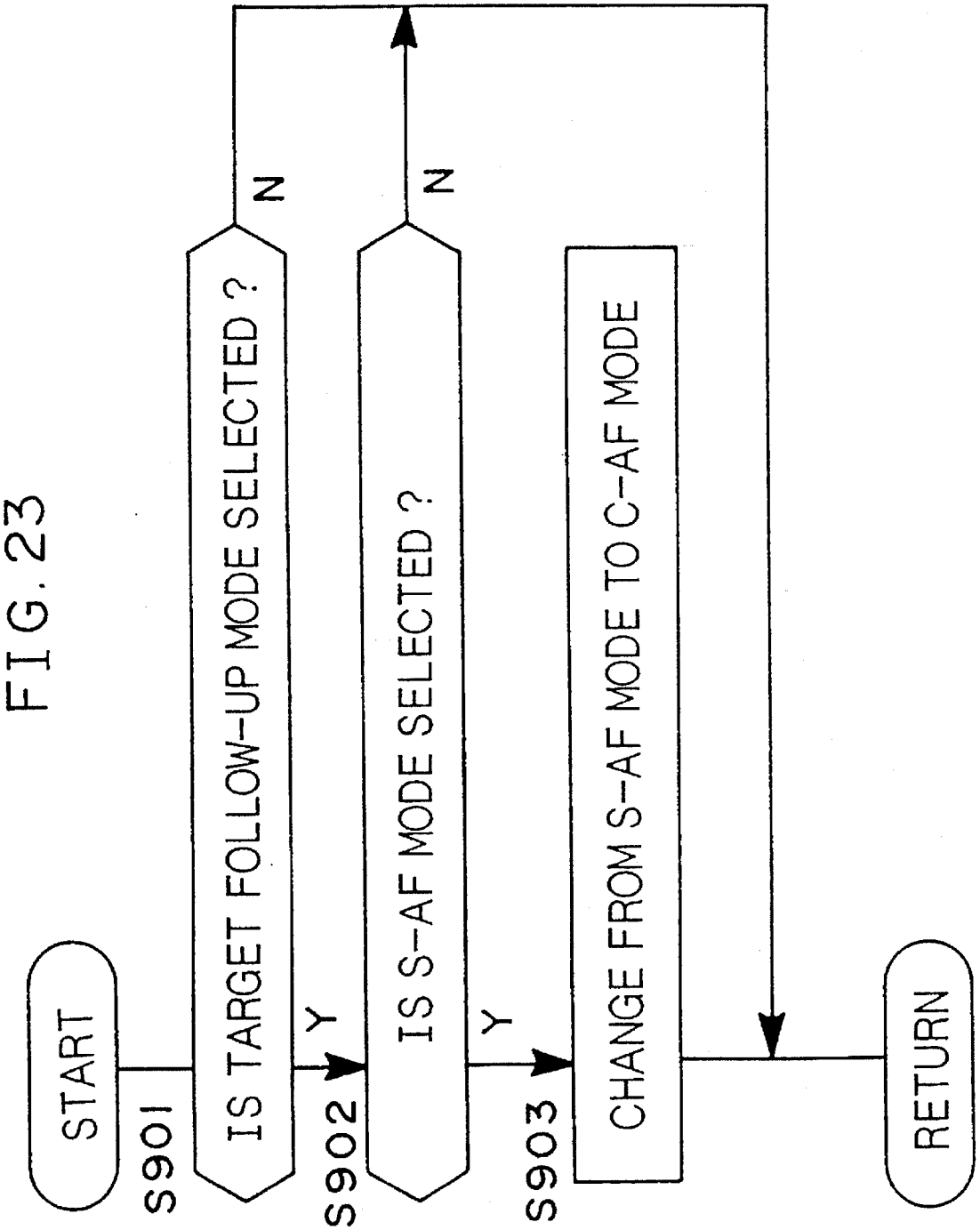
FIG. 23 is a flow chart for explaining a first version of a subroutine SR13 of the program executed by the CPU 61 for selecting an AF mode.
Figure 24:
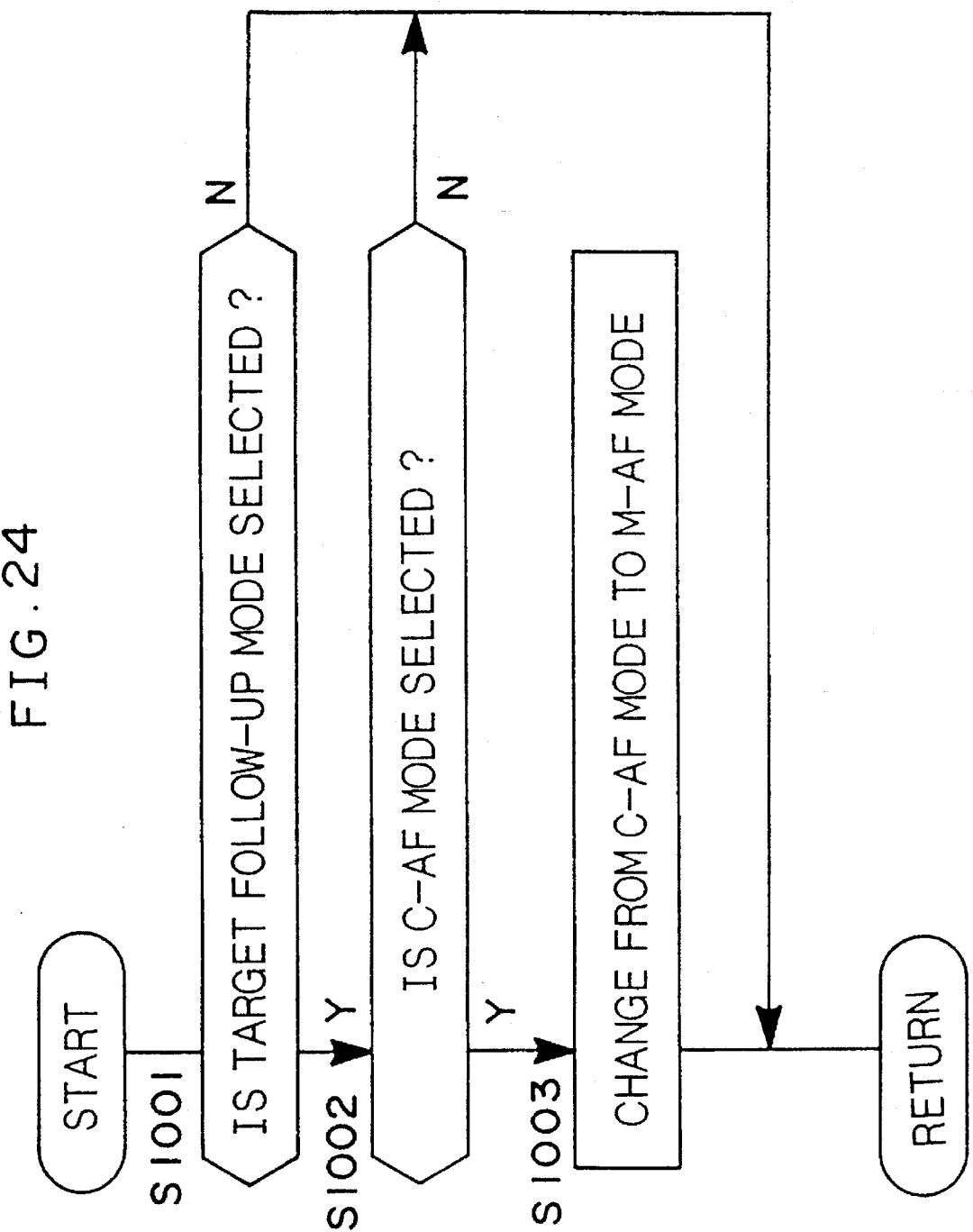
FIG. 24 is a flow chart for explaining a second version of this AF mode selecting subroutine SR13.
Figure 27B:
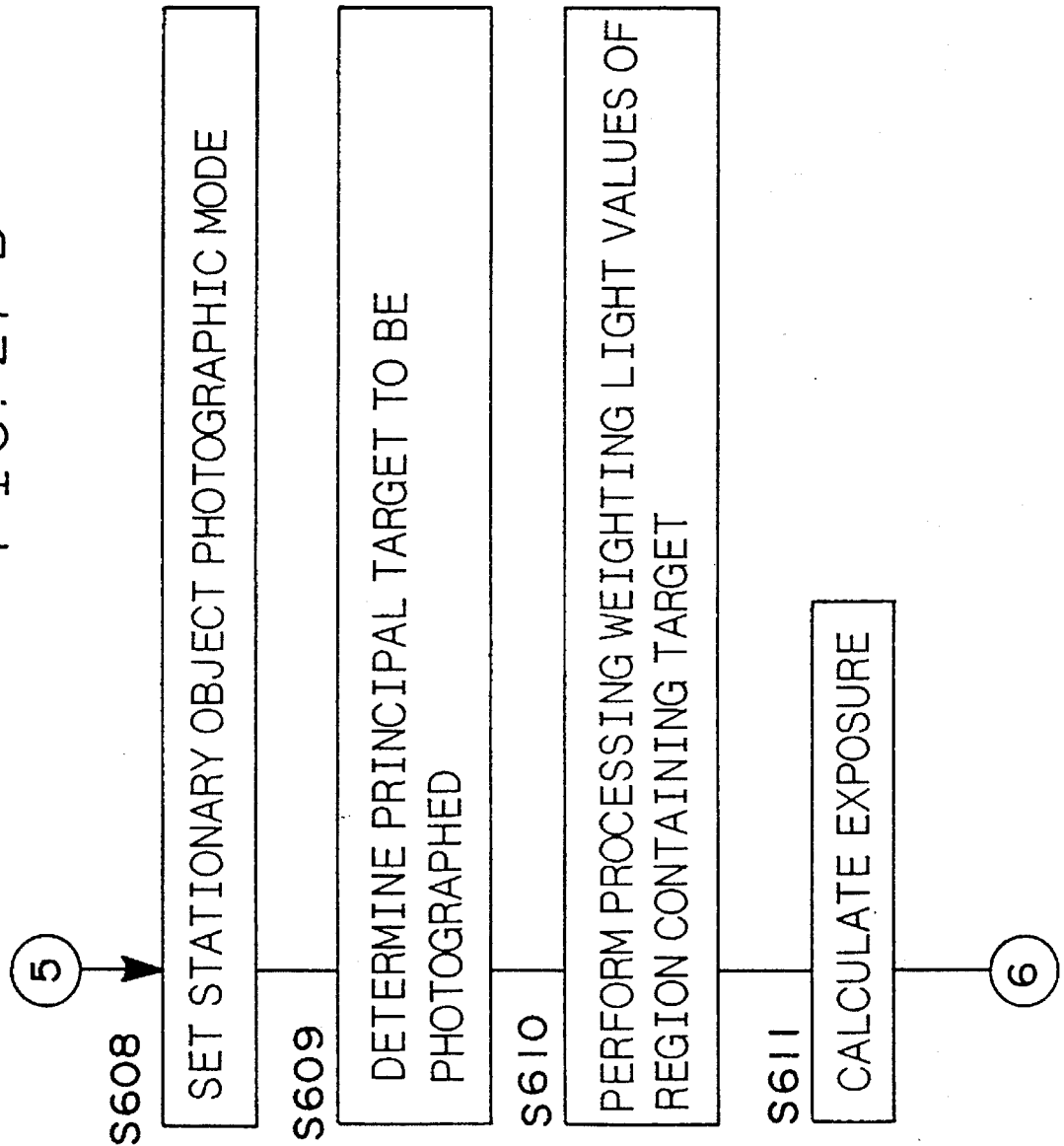

Three versions of the details of the subroutine SR13 called from the flow chart of FIG. 19 are shown in the flow charts of FIGS. 23, 24, and 25. Since in the flow charts of FIG. 20A and FIG. 20B described above the target object follow-up mode was set and operated according to the photographic mode, therefore it will be explained how the focus detection mode is controlled, when the target object follow-up mode has been selected, using the flow charts of FIGS. 23 through 25 described below.

(a) A first example of control

The FIG. 23 flow chart shows a first example of control of the AF mode, suitable for a camera which is provided with two AF modes: an S-AF mode and a C-AF mode.

In the first decision step S901, a decision is made as to whether or not the target object follow-up mode is being selected according to orders from the follow-up area designation member 73, and if in fact the target object follow-up mode is being selected then the flow of control proceeds to the decision step S902, while otherwise this SR13 subroutine terminates. In the decision step S902, a decision is made as to whether or not the AF mode is being set to the S-AF mode according to orders from the focus detection mode changeover unit 71, and if in fact the AF mode is being set to the S-AF mode then the flow of control proceeds to the step S903, while otherwise this SR13 subroutine terminates. Next, in the step S903, the set AF mode is changed over from the S-AF mode to the C-AF mode. In this manner, when the target object follow-up mode is operating, it is possible always to ensure proper adjustment of the focus point to the object to be photographed which is being followed up within the predetermined focus detection area in the photographic field of view. And, finally, this subroutine SR13 terminates and returns control to the main program whose flow chart is shown in FIG. 19.

(b) A second example of control

The FIG. 24 flow chart shows a second example of control of the AF mode, suitable for a camera which is provided with two AF modes, which in this case are a C-AF mode and an M-AF mode.

In the first decision step S1001, a decision is made as to whether or not the target object follow-up mode is being selected according to orders from the follow-up area designation member 73, and if in fact the target object follow-up mode is being selected then the flow of control proceeds to the decision step S1002, while otherwise this SR13 subroutine terminates. In the decision step S1002, a decision is made as to whether or not the AF mode is being set to the C-AF mode according to orders from the focus detection mode changeover unit 71, and if in fact the AF mode is being set to the C-AF mode then the flow of control proceeds to the step S1003, while otherwise this SR13 subroutine terminates. Next, in the step S1003, the set AF mode is changed over from the C-AF mode to the M-AF mode. In this manner, when the target object follow-up mode is operating, the focus detection area can be always changed to coincide with the object to be photographed which is being followed up, and it is possible to ensure proper adjustment of the focus point wherever the object to be photographed is located within the photographic field of view. And, finally, this subroutine SR13 terminates and returns control to the main program whose flow chart is shown in FIG. 19.

(c) A third example of control

The FIG. 25 flow chart shows a third example of control of the AF mode, suitable for a camera which is provided with three AF modes: an S-AF mode, a C-AF mode, and an M-AF mode.

In the first decision step S1101, a decision is made as to whether or not the target object follow-up mode is being selected according to orders from the follow-up area designation member 73, and if in fact the target object follow-up mode is being selected then the flow of control proceeds to the decision step S1102, while otherwise this SR13 subroutine terminates. In the decision step S1102, a decision is made as to whether or not the AF mode is being set to the S-AF mode according to orders from the focus detection mode changeover unit 71, and if in fact the AF mode is being set to the S-AF mode then the flow of control proceeds to the step S1103, while if the AF mode is being set to a mode other than the S-AF mode then the flow of control proceeds to the decision step S1104. Next, in the step S1103, the set AF mode is changed over from the S-AF mode to the M-AF mode. In this manner, when the target object follow-up mode is operating, the focus detection area can be always changed to coincide with the object to be photographed which is being followed up, and it is possible to ensure proper adjustment of the focus point wherever the object to be photographed is located within the photographic field of view. Then this subroutine SR13 terminates.

On the other hand, in the decision step S1104, a decision is made as to whether or not the AF mode is being set to the C-AF mode according to orders from the focus detection mode changeover unit 71, and if in fact the AF mode is being set to the C-AF mode then the flow of control proceeds to the step S1105, while otherwise this SR13 subroutine terminates. Next, in the step S1105, the set AF mode is changed over from the C-AF mode to the M-AF mode. In this manner, when the target object follow-up mode is operating, the focus detection area can be always changed to coincide with the object to be photographed which is being followed up, and it is possible to ensure proper adjustment of the focus point wherever the object to be photographed is located within the photographic field of view. And, finally, this subroutine SR13 terminates and returns control to the main program whose flow chart is shown in FIG. 19.

Now, although the description of the embodiments shown in FIGS. 23 through 25 has been made in terms of how the focus detection mode is controlled when the target object follow-up mode has been set, as an alternative it would also be acceptable for the construction to be such that the target object follow-up mode is automatically selected when the focus detection mode has been set to the C-AF mode or the M-AF mode, in a manner opposite to that practiced in the shown embodiments.

The flow chart shown in FIG. 26 shows another possibility for the operation of the subroutine SR11 described above, and in this example the photographic mode is changed over in accordance with the target object follow-up mode.

First, in the first decision step S1201, a decision is made as to whether or not the target object follow-up mode is being selected according to orders from the follow-up area designation member 73, and if in fact the target object follow-up mode is being selected then the flow of control proceeds to the decision step S1202. In the decision step S1202, a decision is made as to whether or not the photographic mode is being set to a photographic mode suitable for photography of an object which is stationary, according to orders from the photographic mode selection unit 70; and if in fact the photographic mode is being set to a photographic mode suitable for photography of an object which is stationary, then the flow of control proceeds to the step S1203, while otherwise the flow of control proceeds to the step S1204.

Next, in the step S1203, the set photographic mode is changed over from the photographic mode suitable for photography of an object which is stationary to a photographic mode suitable for a moving object. This is done because the setting of the target object follow-up mode implies that the object to be photographed will move within the photographic field of view, and, since exposure control cannot be performed in a manner suitable for a photography of a moving object when the photographic mode is one suitable for photography of a stationary object, accordingly the photographic mode is automatically changed over to one suitable for photography of a moving object.

The target pursuit device of the present invention has been shown and described in terms of several embodiments thereof, but its details are not to be considered as being limited by any of the perhaps quite fortuitous details of said shown embodiments or of the drawings. For instance, although the present invention has been shown and described as being applied to a single lens reflex type camera, this is not to be considered as limitative, since the present invention is also suitable for application, for example, to an imaging device for photography of moving images, such as a video camera or the like. Other variations are also possible. Accordingly, the scope of the present invention is to be considered as limited only by the terms of the appended claims, which follow.

We claim:

1. A target follow-up device, having:

an imaging device which outputs input image data having a plurality of color components;

a memory circuit which, based upon the output from said imaging device, records image data of a target to be followed up as reference data;

a calculation circuit which calculates the amount of correlation between said input image data and said reference image data; and a position detection circuit which, based upon said amount of correlation, detects the position of said target;

a color selection circuit which variably selects at least one color from a plurality of colors contained in common by said input image data and said reference image data prior to the calculation of said amount of correlation by said calculation circuit;

wherein said calculation circuit calculates said amount of correlation for the color component selected by said color selection circuit.

2. A target follow-up device according to claim 1, wherein said imaging device outputs input image data made up from a plurality of picture elements;

said memory circuit records reference image data made up from a plurality of picture elements; and said calculation circuit obtains the difference for each individual picture element between said input image data and said reference image data, and calculates the minimum residue as being the minimum value of the residue amounts which result from summing said differences.

3. A target follow-up device according to claim 1, further comprising a strongest color determination circuit which sums said reference image data separately for each said color component and detects for which color the result of said summation is the greatest;

and wherein said color selection circuit selects the color determined by said strongest color determination circuit.

4. A target follow-up device according to claim 1, further comprising:

a neighboring region setting circuit which sets a neighboring region within a photographic field which neighbors on the region containing said reference image data; and a greatest difference color determination circuit which sums said reference image data separately for each said color component, sums said input image data contained within said neighboring region separately for each said color component, and determines for which color the difference between the summation result for said reference image data and the summation result for said input image data contained within said neighboring region is the greatest;

and wherein said color selection circuit selects the color determined by said greatest difference color determination circuit.

5. A target follow-up device according to claim 2, further comprising:

a neighboring region setting circuit which sets a neighboring region within a photographic field which neighbors on the region containing said reference image data; and:

a residue color determination circuit which calculates said residue for said reference image data and said input image data contained within said neighboring region separately for each said color component, and determines for which color the resulting residue is an extremum;

and wherein said color selection circuit selects the color determined by said residue color determination circuit.

* * * * *